(12) United States Patent
Hosoya et al.

(10) Patent No.: US 6,431,131 B1
(45) Date of Patent: Aug. 13, 2002

(54) APPARATUS AND A METHOD FOR SLIDING MODE CONTROL

(75) Inventors: Hajime Hosoya; Hidekazu Yoshizawa; Norio Moteki, all of Atsugi (JP)

(73) Assignee: Unista Jecs Corporation, Kanagawa-ken (JP)

( * ) Notice: Subject to any disclaimer, the term of this patent is extended or adjusted under 35 U.S.C. 154(b) by 0 days.

(21) Appl. No.: 09/704,552

(22) Filed: Nov. 3, 2000

(30) Foreign Application Priority Data

| Nov. 4, 1999 | (JP) | 11-313221 |
| Nov. 30, 1999 | (JP) | 11-339317 |
| Dec. 8, 1999 | (JP) | 11-348854 |

(51) Int. Cl.$^7$ .................................. F01L 1/34
(52) U.S. Cl. ................. 123/90.15; 123/90.16; 123/90.17; 123/90.18; 318/802
(58) Field of Search .............. 123/90.15, 90.16, 123/90.17, 90.18, 90.11, 90.12, 90.31, 674, 406.59; 91/361, 429, 363 R; 701/102, 103, 105; 318/802

(56) References Cited

U.S. PATENT DOCUMENTS

| 4,713,596 A | * | 12/1987 | Bose .......................... 318/802 |
| 5,694,910 A | * | 12/1997 | Hasegawa .................... 123/674 |
| 6,182,636 B1 | * | 2/2001 | Russell et al. ........... 123/90.15 |
| 6,188,953 B1 | * | 2/2001 | Yasui et al. .................. 701/103 |
| 6,189,317 B1 | * | 2/2001 | Yasui et al. .................. 701/103 |
| 6,192,311 B1 | * | 4/2001 | Yasui et al. .................. 701/102 |
| 6,209,517 B1 | * | 4/2001 | Yasui .................... 123/406.59 |
| 6,219,611 B1 | * | 4/2001 | Russell ........................ 701/105 |
| 6,250,283 B1 | * | 6/2001 | Russell et al. ........... 123/90.15 |
| 6,260,521 B1 | * | 7/2001 | Kirschbaum ............. 123/90.11 |

FOREIGN PATENT DOCUMENTS

JP          10-141022         5/1998

* cited by examiner

Primary Examiner—Mark Paschall
Assistant Examiner—Fadi H. Dahbour
(74) Attorney, Agent, or Firm—Sughrue Mion, PLLC

(57) ABSTRACT

In a valve timing control apparatus for an internal combustion engine using an oil pressure control, a feedback correction amount is calculated so as to have a linear term proportional to a deviation between a target value and an actual value of the valve timing control apparatus, and a non-linear term using a switching function by a sliding mode control. Further, a dither control is added to the feedback correction amount and a learning is performed for a basic control amount and a control gain. Therefore, a control can be executed with high robust, high accuracy and quick response.

44 Claims, 17 Drawing Sheets

APPARATUS AND A METHOD FOR SLIDING MODE CONTROL

BACKGROUND OF THE INVENTION

Field of the Invention

The invention relates to the art of controlling sliding mode, for example, to the art of controlling sliding mode used for feedback controlling rotation phase of a camshaft relative to a crankshaft for an internal combustion engine to a target value.

A conventional valve timing apparatus is known as a vane type valve timing controlling apparatus disclosed in Japanese Unexamined Patent Publication 10-141022 such as an apparatus for successively changing opening and closing timing of intake and exhaust valves by changing rotation phase of a camshaft relative to a crankshaft.

This apparatus forms concave portions in the inner surface of a cylindrical housing fixed to a cam sprocket in which vanes of an impeller are accommodated in the concave portions wherein the camshaft rotates relative to the cam sprocket within the range where the vanes of the impeller can move in the concave portions and by relatively supplying and discharging oil into a pair of oil pressure chambers, the vanes are held in the mid position of the concave portions and thus successive changing of rotation phase can be carried out.

When oil pressure of the pair of the oil pressure chambers is adjusted to the level by which a target value of rotation phase can be obtained, a control valve closes an oil pressure passage to stop supplying and discharging oil.

PID (proportional-integral derivative) control is generally adopted as control method of the camshaft rotation phase wherein a control amount is calculated with a deviation (error amount) between an actual angle and a target angle of the camshaft as only one variable.

However, in order to carry out the PID control with a good response characteristic it is preferable that a feedback gain is set variable since viscosity of oil changes with oil temperature and oil pressure, but matching the setting as above is not easy.

In the case of oil pressure control there is wide operation dead band for a switching valve (spool valve) to switch oil supply and oil discharge and therefore dither control is executed with dither components in addition to PID to go beyond the dead band wherein judgement of addition of dither components is required to do with accuracy, bringing a complicated control and more capacity of ROM and RAM. In order to decrease variations of dead band width for each part for securing control accuracy, improvement in machining for parts is required, causing increase of machining costs.

Therefore, there has been considered a sliding mode control which has less influence due to disturbances, instead of a general PID control into.

Then, there is review of application of a sliding mode control into the above oil pressure type valve timing control apparatus and when the sliding mode control is designed according to the conventional theory, the influence due to disturbances such as changes of the oil temperature and the oil pressure is restrained but it is found out that the above sliding control is not effective to the dead band and is no alternative and no supplement for the above dither control.

And also in the case of application of a sliding mode control into a component with a dead band, the feedback control is executed by setting a basic control amount to a central value of an operation dead band and adding a feedback control amount to go beyond the operation dead band to the basic control amount whereby due to component variations and aging deviation between the central value of the operation dead band and the basic control amount may arise, and variations in size of operation dead bands may bring in decrease of response characteristic and occurrence of hunting.

SUMMARY OF THE INVENTION

In view of the foregoing, the present invention has an object of carrying out a sliding mode control with higher robust by restraining decrease of response characteristic caused by operation dead band in a control object having the operation dead band to a control amount such as an oil pressure control system.

Another object of the present invention is to provide an apparatus to carry out higher accuracy control in an apparatus with a feedback control by a sliding mode control.

A further object of the present invention is to carry out a control with higher accuracy and in quicker response by avoiding influence caused by component variations and aging by a learning control in a sliding mode control of a control object having operation dead band as above.

The present invention for achieving the above first object is constituted to set a linear term of a control amount as a function of deviation between a target position and an actual position of a control object in an apparatus for sliding-mode controlling a control object having an operation dead band.

Thus even when the actual position of the control object does not change by entering within the operation dead band, since there exists a deviation (≠0) between the target position and the actual position of the control object, transfer velocity to the switching line to switch a feedback gain is given properly by a linear term set as the function of deviation, resulting in convergence to the target position with a good response characteristic.

The control object of the present invention may be applied to an oil pressure control system and in the oil pressure control system having a wider operation dead band by a switching valve and the like, the control can be carried out with quicker response by restraining influence caused by the wider operation dead band.

In particular, in a case that a valve timing control apparatus in an internal combustion engine is the control object, wherein rotation phase of a camshaft relative to a crankshaft is controlled variably and successively by the oil pressure control, and the supply and discharge of oil to an oil pressure actuator controlled by oil pressure is selectively controlled by the switching valve, in the oil pressure control type valve timing control apparatus having a wider operation dead band by the switching valve, the control with quick response is carried out by restraining influence due to the dead band.

A linear term may be set by adding a term proportional to the deviation between the target position and the actual position of the control object to a term proportional to operation velocity of the control object.

By this, transfer velocity to the switching line is given properly even on entering into the dead band by a term proportional to the deviation between the target position and the actual position of the control object and when out of the operation dead band, since transfer velocity adjustment function to the switching line caused by a term proportional to operation velocity of the control object is added, more adequate transfer velocity can be obtained and the response can be improved.

A linear term may be set based only on the term proportional to the deviation between the target position and the actual position of the control object.

As described above, even in the case the linear term of the control object is set only by the term proportional to the deviation between the target position and the actual position of the control object, since not only within entering into operation dead band but also out of the operation dead band, transfer velocity to the switching line is given properly, the sliding mode control can be realized and by omitting the term proportional to operation velocity of the control object, easy control (calculation) can be done to thereby save program capacity.

Next, the present invention for achieving the above second object is constituted to feedback control a control object to a target value by correcting a control amount calculated based on a sliding mode control by a dither control.

According to this constitution, based on the sliding mode control, a control with higher robust can be carried out with less influence due to disturbance compared with the feedback control by an ordinary PID control, as well as the control with more accuracy can be carried out based on the correction by the dither control.

Further, a switching function in the sliding mode control may be calculated as a function of a deviation between a target position and an actual position of the control object.

According to this constitution, in the sliding mode control a control amount (non-linear term) corresponding to the deviation can be given and then the feedback control with a good response characteristic can be carried out by the automatic calculation of the control amount to go beyond the dead band and the like.

Moreover, with the correction by the dither control, since the non-linear term is finely adjusted, a highly accurate control can be carried out while securing the optimum response characteristic. In other words, since the dither control requires only an adjustment function to supplement the sliding mode control, the control including additional judgement conditions and the like can be simplified compared with the dither control added to a conventional PID control to thereby save ROM and RAM capacities.

The conditions to which a correction amount by the dither control is added may be set based on the switching function.

Thus since the switching function is calculated as the function of the deviation, the correction amount by the dither control can be added according to the deviation when necessary only. Further, a calculation load for judgement is reduced by carrying over the switching function calculated for the sliding mode control.

The above switching function S may be calculated in the following formula.

$$S = \gamma \times PERR + d(PERR)/dt \quad (1)$$

γ: inclination

PERR: deviation between a target value and an actual value of a control object d(PERR)/dt: differential value of the deviation Thus since a switching function S includes the deviation between the target value and the actual value of the control object (PERR) and also a differential value (d) of the deviation, it makes the sliding mode along the switching line more smooth.

The switching function S may be calculated in the following formula.

$$S = \gamma \times PERR + d(NOW)/dt \quad (2)$$

γ: inclination

PERR: deviation between a target value and an actual value of a control object d(NOW)/dt: actual velocity of a control object Thus, even when an actual velocity is used instead of the differential value of the deviation d(PERR)/dt, it makes the sliding mode control along the switching line smooth as above.

A control amount U may be calculated in the following formula for the switching function S.

$$U = c \times PERR + d \times \{d(NOW)/dt\} - K\{S/(|S|+\delta)\} \quad (3)$$

d(NOW)/dt: actual velocity of a control object c, d: constant

δ: chattering prevention coefficient

In the above formula, a linear term control amount UL expressed by $c \times PERR + d \times \{d(NOW)/dt\}$ means adjusting velocity of a control system state approaching the switching line (S=0), and a non-linear term control amount UNL means generating the sliding mode along the switching line.

The conditions on which a correction amount by the dither control is added may be set in the following formula.

$$S \cdot \Delta S \geq 0 \text{ or } |S| \geq S0$$

ΔS: variation amount of S

S0: positive predetermined value

According to the above, when a target position of the control object varies from a stationary state wherein a switching valve and the like are in within the dead band, during a time period until the switching valve and the like are out of the dead band, the actual position of the control object does not vary, and so the deviation and the switching function S (both are absolute values and the same hereinafter) continue to increase. That is, $S \cdot \Delta S \geq 0$. During this period of time, the dither components are added without any condition so that the control object starts to move quickly out of the dead band.

When the control object starts to move out of the dead band, the deviation and the switching function S both start to decrease, however, until the control object approaches the target position to some degree, that is, when $|S| \geq S0$ is satisfied, the addition of the dither components makes the control object approaching the target position quickly, resulting in good response characteristic.

When the control object approaches a target position to reach $|S| < S0$, the addition of the dither components is stopped, which restrains overshooting due to excessive control amount to enable quick convergence to the target position.

The above setting of additional condition of the dither components as well as the linear term of the sliding mode control (for example, set proportional to the deviation) have a role of making the control state approaching the switching line (S=0) quickly while restraining overshooting to start the sliding mode along the switching line.

In the case the control object is a valve timing apparatus for an internal combustion engine as above, a control with good response is carried out by restraining influence of the dead band the same as above and also the dither control is used so that the dead band can be carefully adjusted and the control accuracy can be improved.

One aspect of the present invention for achieving the above third object is constituted such that, in a sliding mode control apparatus wherein the feedback control amount to go beyond an operation dead band calculated by a sliding mode control is added to a basic control amount set corresponding to a central value of the operation dead band to the control amount of a control object whereby the feedback control is started and the feedback control is stopped when a deviation between a target value and an actual value of the control object gets within a predetermined dead band, the basic control amount is corrected based on a steady deviation between the target value and the actual value.

In this case, as described above, when the basic control amount deviates from the central value of the operation dead band, the steady deviation between the target value and the actual value of the control object occurs. Therefore, the basic control amount is corrected based on the steady deviation to correspond to the central value of the operation dead band so that a deterioration is response characteristic, occurrence of overshooting and undershooting, and occurrence of steady deviation can be restrained.

Another aspect of the present invention for achieving the third object is constituted such that, in a sliding mode control apparatus wherein the feedback control amount to overcome an operation dead band calculated by a sliding mode control is added to a basic control amount set corresponding to a central value of the operation dead band to the control amount of a control object whereby the feedback control is started and the feedback control is stopped when a deviation between a target value and an actual value of the control object get within a predetermined control dead band, when the deviation gets into the control dead band, while carrying out the feedback control using only a non-linear term and at the same time varying a gain of the non-linear term of the feedback control amount to get the deviation between the target value and the actual value within a set range, the gain is adjusted.

With this constitution, the non-linear term is adjusted to a degree to slightly overcome the operation dead band and therefore chattering does not occur and a good response characteristic is secured.

The switching function S of the sliding mode control may be calculated as a function of the deviation between the target value and the actual value of the control object.

With this constitution, the gain of the non-linear term is switched corresponding to the deviation state, resulting in smooth convergence to the target value.

Further, the switching function S may be calculated by the formula (1) or formula (2) and the effect as described above can be obtained.

Also the control amount U in the above sliding mode control may be calculated by the formula (3), thereby the above described effect can be obtained.

Further, in the case the control object is a valve timing control apparatus for an internal combustion engine as described above, a control with a good response characteristic while restraining influence due to the operation dead band can be carried out and also the above described effect by the invention can be obtained.

The other objects and features of this invention will become understood from the following description with reference to the accompanying drawings.

EMBODIMENT

Figure 1:
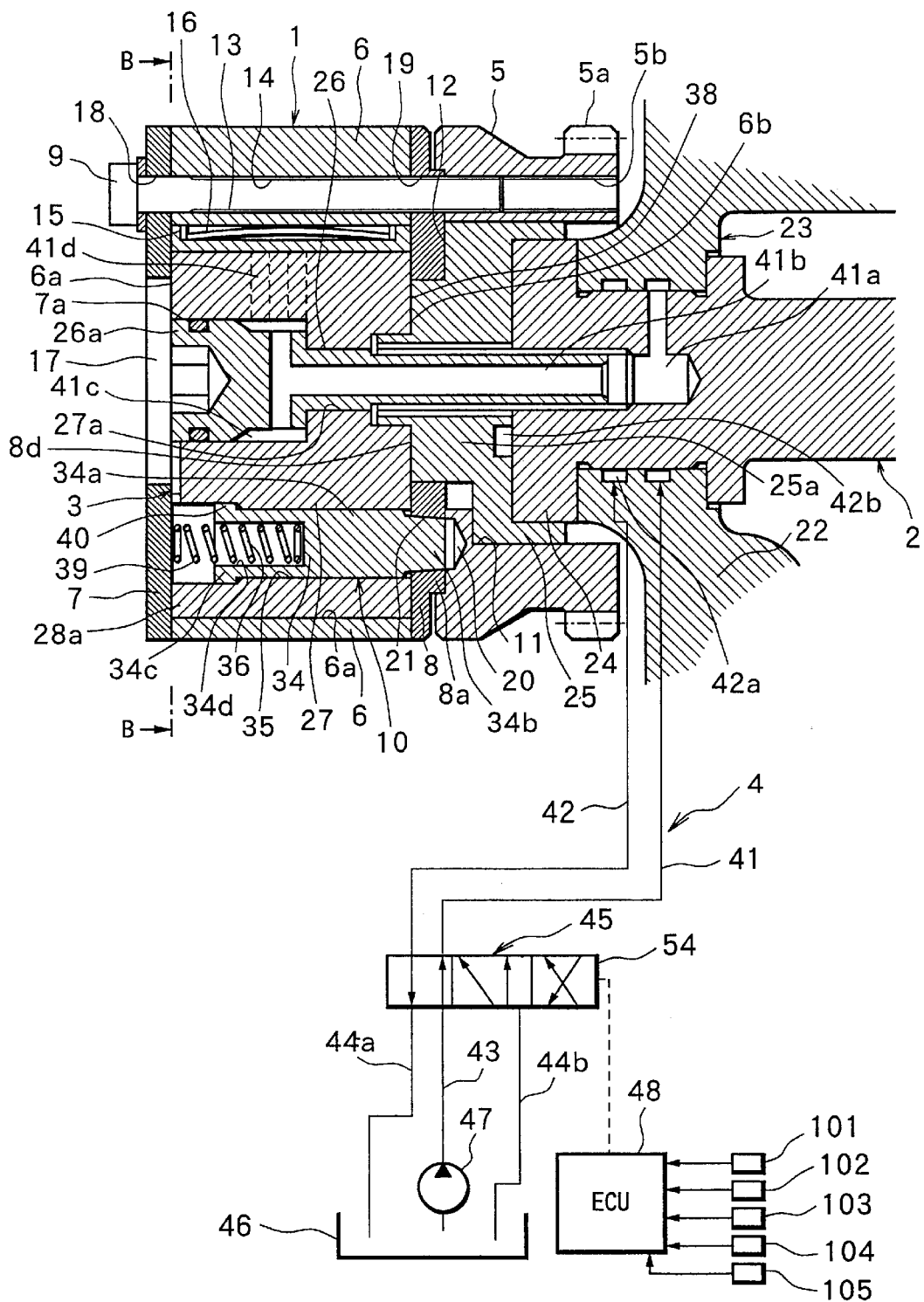
FIG. 1 is a cross sectional view of a valve timing control mechanism in common with each embodiment.
Figure 2:
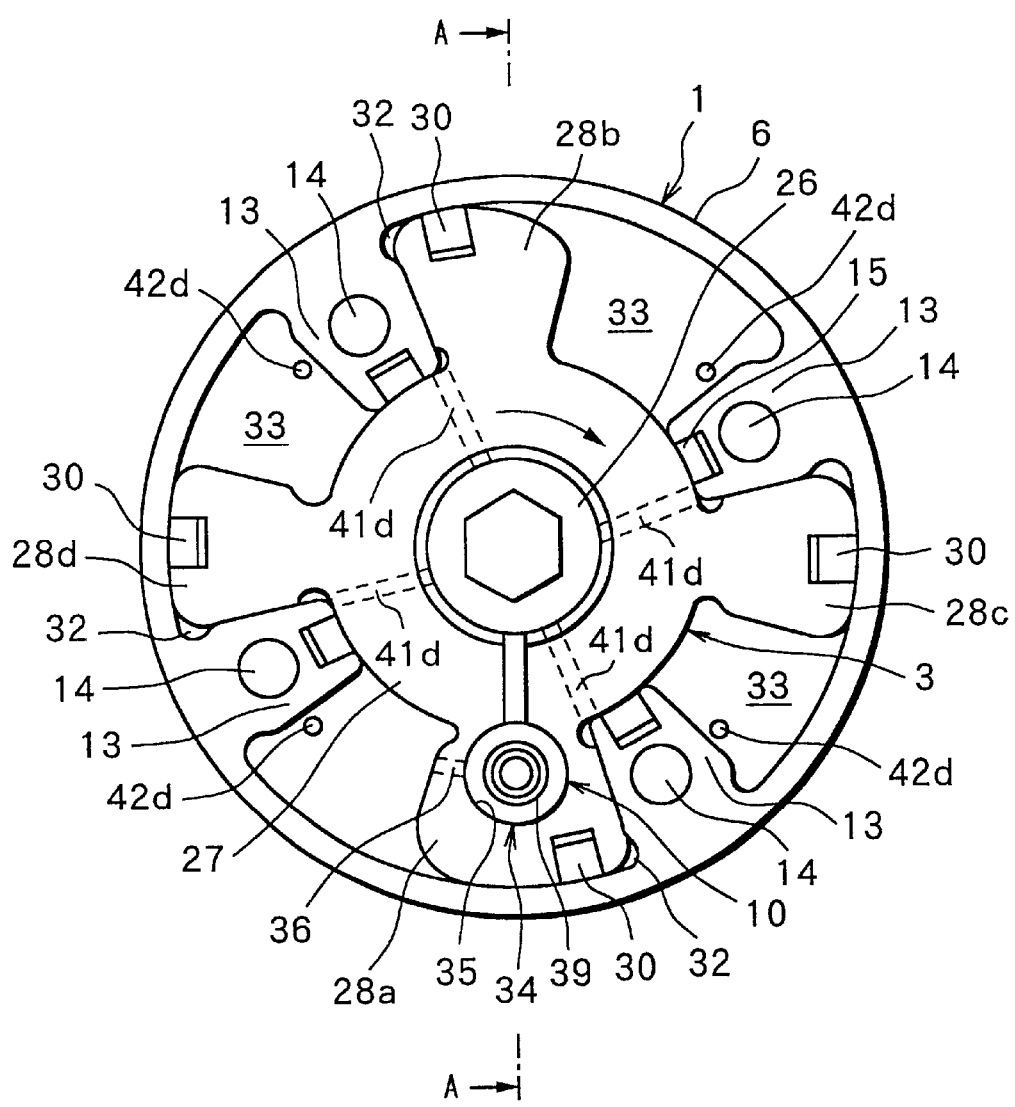
FIG. 2 is a cross sectional view taken on line B—B in FIG. 1.
Figure 3:
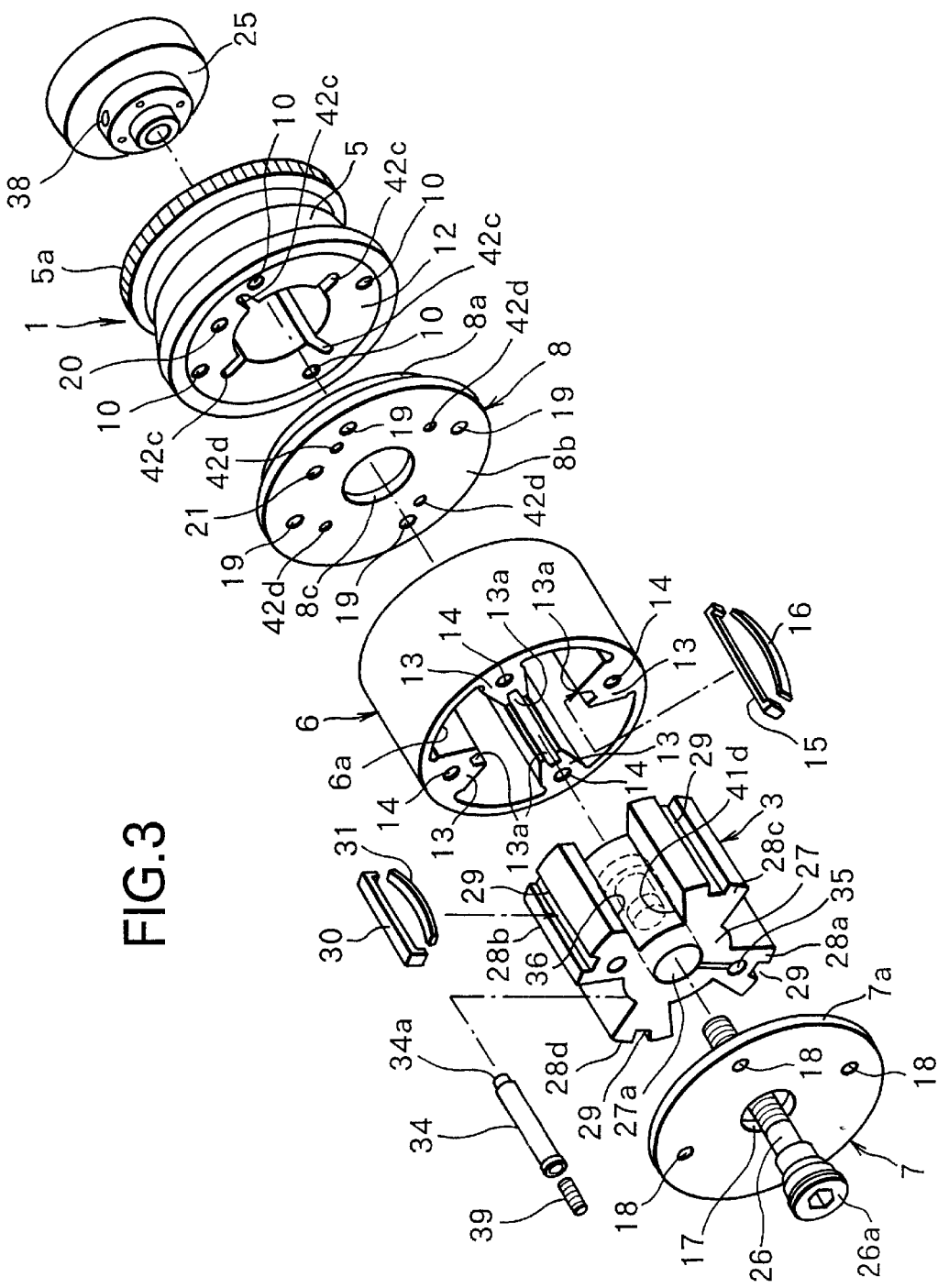
FIG. 3 is an exploded perspective view of the valve timing control mechanism.

Embodiments of the present invention will be explained as follows.

FIG. 1~FIG. 6 show mechanical portions of a valve timing control apparatus in an internal combustion engine wherein the feedback control is carried out by a sliding mode control using a dither control, applied to an intake valve side.

The valve timing control apparatus as shown in the figures is equipped with a cam sprocket 1 (timing sprocket) driven to rotate through a timing chain by a crankshaft of an engine (not shown), a camshaft 2 mounted rotatably relative to the cam sprocket 1, a rotation member 3 fixed to an end of the camshaft 2 to be received rotatably in the cam sprocket 1, an oil pressure circuit 4 rotating the rotation member 3 relative to the cam sprocket 1, and a lock mechanism 10 selectively locking a relative rotation position of the cam sprocket 1 and the rotation member 3 at a predetermined position.

The cam sprocket 1 includes a rotation portion 5 having a tooth portion 5a on its periphery with which the timing chain (or timing belt) meshes, a housing 6 disposed in the front of the rotation portion 5 to rotatably receive the rotation member 3, a disc-shaped front cover 7 which functions as a lid for closing a front end of the housing 6 and a substantially disc-shaped rear cover 8 disposed between the housing 6 and the rotation portion 5 to close a rear end of the housing 6. The rotation portion 5 is joined integrally with the housing 6, the front cover 7, and the rear cover 8 by four small diameter bolts 9 in an axial direction.

The rotation portion 5 has a substantially annular shape in which four female screw bores 5b are through formed in the front-rear direction at equally spaced positions of 90 degrees in its peripheral direction and the small diameter bolts 9 are screwed to these female screw bores 5b, and also in the internal and central position of the rotation portion 5, a stepped fitting bore 11 is through formed into which a sleeve 25 for forming a passage to be described later is fitted. Moreover, at the front end of the rotation portion 5, a disc-shaped fitting groove 12 is formed into which the rear cover 8 is fitted.

The housing 6 has a cylindrical shape with the front and rear ends opened, and at 90 degree positions in the peripheral direction of the inner peripheral surface thereof, four partition walls 13 are formed projectingly. The partition walls 13 are formed in trapezoidal shapes in cross section and disposed along the axial direction of the housing 6 and both ends of each of the walls 13 are flush with both ends of the housing 6. At the base end side of the housing, four bolt through holes 14 are through formed in the axial direction into which the small diameter bolts 9 are inserted. Further, at the central position of the internal face of each of walls 13, a cut-out retaining groove 13a is formed within which C-shaped sealing member 15 and a plate spring 16 urging the sealing member 15 inwards are held fittedly.

Further, the front cover 7 is formed with a relatively large diameter bolt through hole 17 at its center and four bolt through holes at the positions corresponding to the respective bolt through holes 14 in the housing 6.

The rear cover 8 is formed with a disc portion 8a held fittedly within the fitting groove 12 of the rotation portion 5 at the rear end thereof, an insert hole 8c into which a small diameter annular portion 25a is inserted at the center thereof and further four bolt through holes 19 at the positions corresponding to the bolt through holes 14.

The camshaft 2 is supported rotatably through a cam bearing 23 at the tip end portion of a cylinder head 22, and at a predetermined position in the outer peripheral surface of the camshaft 2, a cam (not shown in the figures) is integrally mounted to open an intake valve through a valve lifter and a flange portion 24 is integrally mounted to its front end portion.

The rotation member 3 is fixed to the front end of the camshaft 2 through a fixing bolt 26 inserted in the axial direction through the sleeve 25 with the front and rear ends thereof fitted into the flange portion 24 and the fitting bore 11, respectively, and is equipped with an annular base portion 27 having a bolt through hole 27a receiving the fixing bolt 26 at the center thereof and with four vanes 28a, 28b, 28c, and 28d integrally mounted at 90 degree positions in the outer peripheral surface of the base portion 27.

Each of the first to fourth vanes (28a~28d) has a substantially inverted trapezoidal shape in cross section and disposed in the concave between each of partition walls 13 to define the front concave and the rear concave in the rotation direction. An advance pressure chamber 32 and a retard pressure chamber 33 are defined between both sides of vanes 28a~28d and both sides of partition walls. Sealing members 30 with C-shape in slide contact with an inner surface 6a of the housing 6 and plate springs 31 urging the sealing members 30 outwards are held and inserted in retaining grooves 29 cut-out in the axial direction at the center of the peripheral surface of each of vanes 28a~28d.

The lock mechanism 10 includes an engagement groove 20 formed at a predetermined outward position of the fitting groove 12 of the rotation portion 5, a tapered engagement bore 21 penetrated at a predetermined position of the rear cover 8 corresponding to the engagement 20, a bore 35 for slide penetrated along the internal axial direction at substantially central position of one of vanes 28 corresponding to the engagement bore 21, a lock pin 34 disposed slidably in the bore 35 of one of the vanes 28, a coil spring 39 in compressive state disposed at the rear end of the lock pin 34 and an oil pressure receiving chamber 40 formed between the lock pin 34 and the bore 35.

The lock pin 34 includes an intermediate diameter lock body 34a at its middle, a conical engagement portion 34b with its front head being smaller in diameter at the front side of the lock body 34a and a stepped, large diameter stopper portion formed on the rear end of the lock body 34a. The lock pin 34 is urged in the direction of the engagement bore 21 by the spring force of the coil spring 39 disposed in compressive state between the bottom surface of a concave groove 34d and an inner end surface of the front cover 7, and is slidable in the direction of it being taken out from the engagement bore 21 by the oil pressure of the oil pressure receiving chamber 40 defined between a peripheral surface between the body 34a and the stopper portion 34c and the inner surface of the bore 35 for slide. This chamber 40 is in communication with the retard oil pressure chamber 33 through a penetrating bore 36 formed in the side of the vane 28. The engagement portion 34b of the lock pin 34 enters into and is in engagement with the engagement bore 21 at the maximum retard rotation position.

The oil pressure circuit 4 includes a first oil pressure passage 41 which supplies and discharges oil pressure to the advance oil pressure chamber 32 and a second oil pressure passage 42 which supplies and discharges oil to the retard oil pressure chamber 33, that is two lines of the oil pressure passages. These oil pressure passages 41, 42 both are connected with a supply passage 43 and a drain passage 44 respectively through an electromagnetic switching valve 45 for passage switching. The supply passage 43 is equipped with an oil pump 47 for supplying oil in an oil pan under pressure while a downstream end of the drain passage 44 is connected with the oil pan.

The first oil pressure passage 41 includes a first passage portion 41a formed in the cylinder head 22 and in the axis of the camshaft 2, a first oil path 41b which branches off in the head portion 26a through an axial direction of a fixing bolt 26 and communicates with the first passage portion 41a, an oil chamber 41c which is formed between a small diameter outer peripheral surface of the head portion 26a and an inner peripheral surface of a bolt insert hole 27a in the base portion 27 of the rotation member 3 to communicate with the first oil path 41b and four branch paths 41d which are formed in radial directions in the base portion 27 of the rotation member 3 to communicate with the oil chamber 41c and each of advance oil pressure chambers 32.

On the other hand, the second oil pressure passage 42 includes a second passage portion 42a in the cylinder head 22 and in an inner one side of the camshaft 2, a second oil path 42b which is formed in a substantially L-shape inside of the sleeve 25 to communicate with the second passage portion 42a, four oil passage grooves 42c which are formed at an outer peripheral side bore edge of the engagement bore 11 of the rotation member 5 to communicate with the second oil path 42b and four oil bores 42d which are formed at approximately 90 degree positions in a circumferential direction of the rear cover 8 to communicate each of the oil passage grooves 42c with the retard oil pressure chamber 33.

In the electromagnetic switching valve 45, a spool valve body of the valve 45 switches each of the oil pressure passages 41, 42 and the supply passage 43 and the drain passages 44a, 44b relatively. Further, the electromagnetic switching valve 45 is switchingly operated by a control signal from a controller 48.

Figure 4:
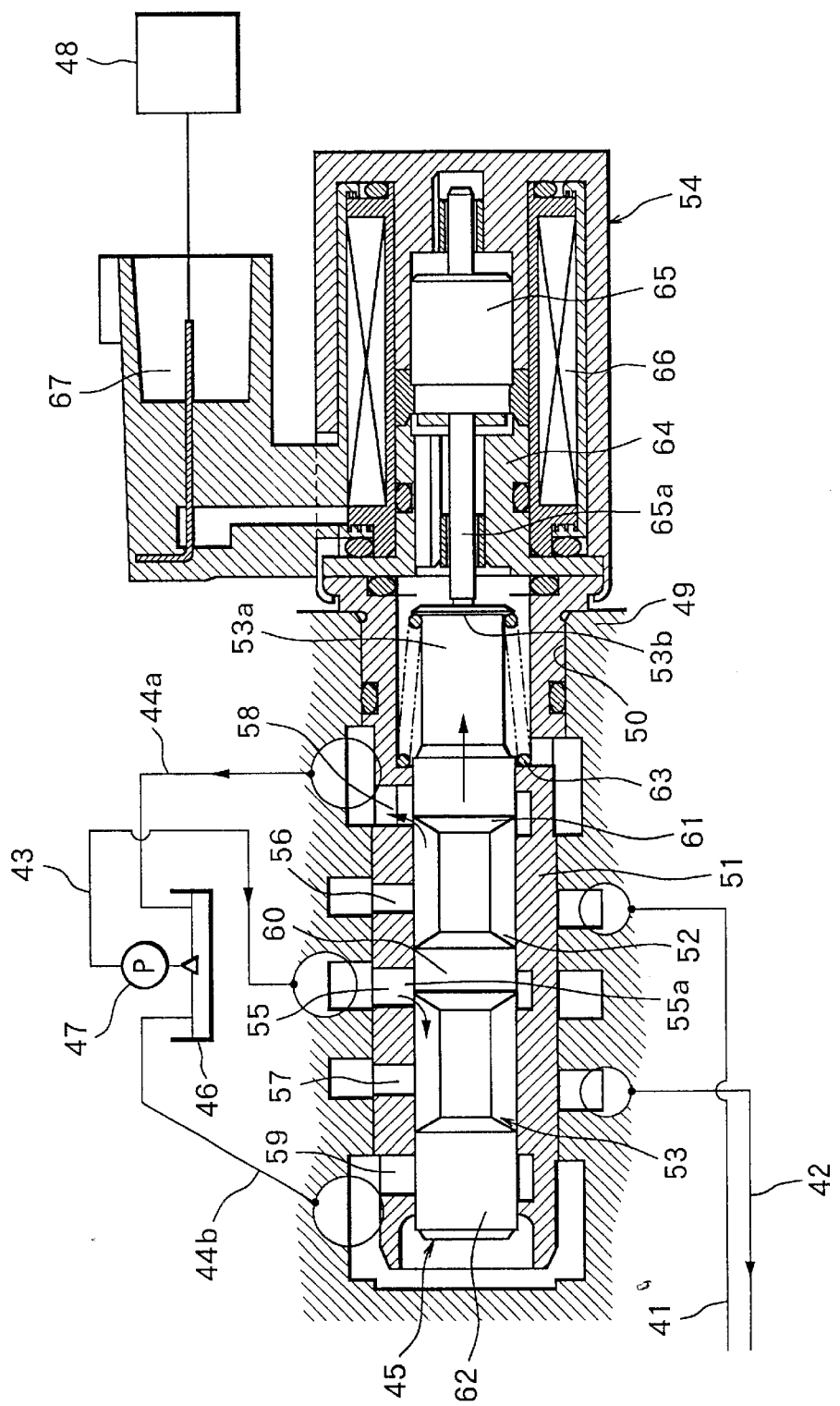
FIG. 4 is a longitudinal sectional view showing an electromagnetic switching valve in the valve timing control mechanism.
Figure 5:
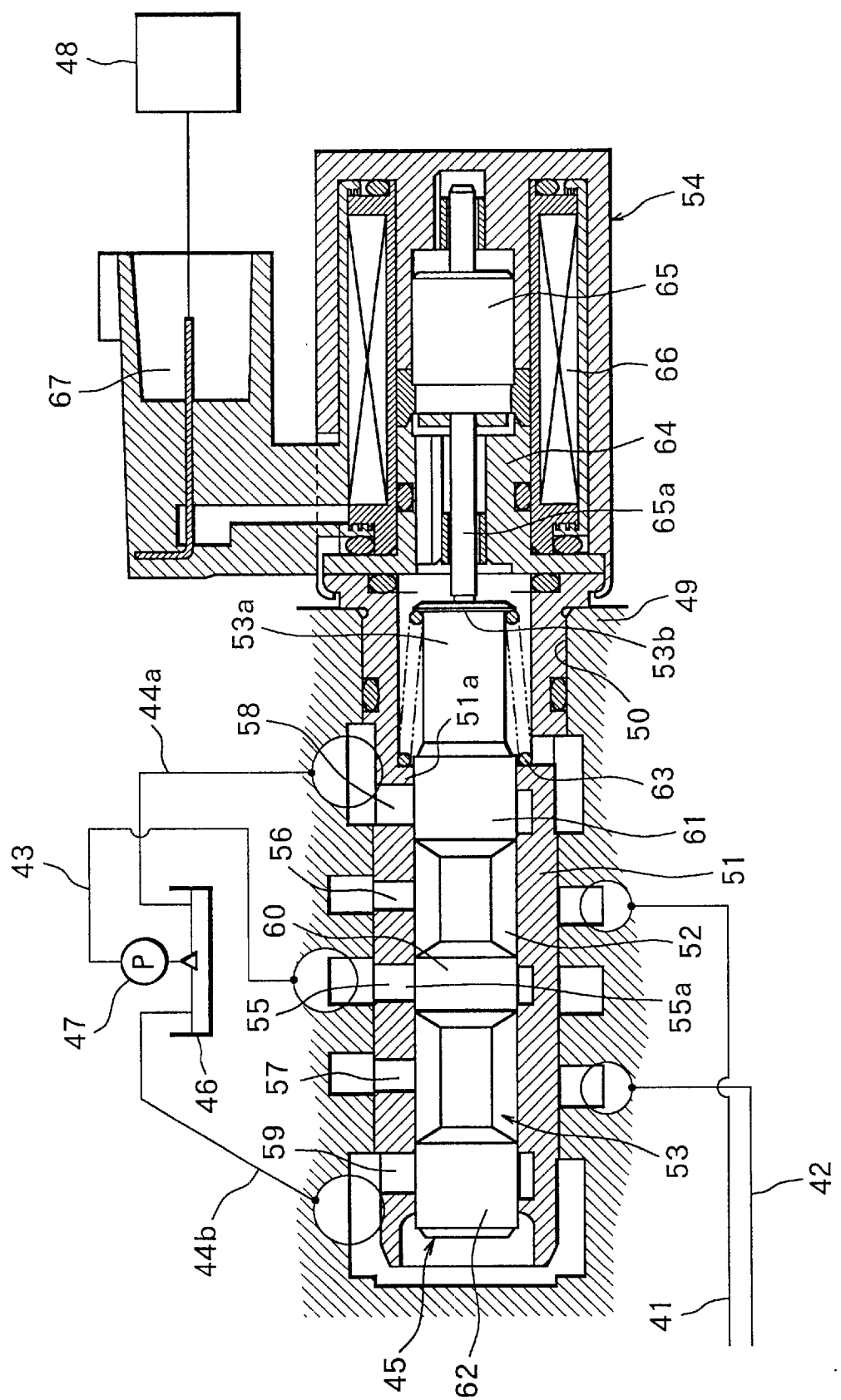
FIG. 5 is a longitudinal sectional view showing an electromagnetic switching valve in the valve timing control mechanism.
Figure 6:
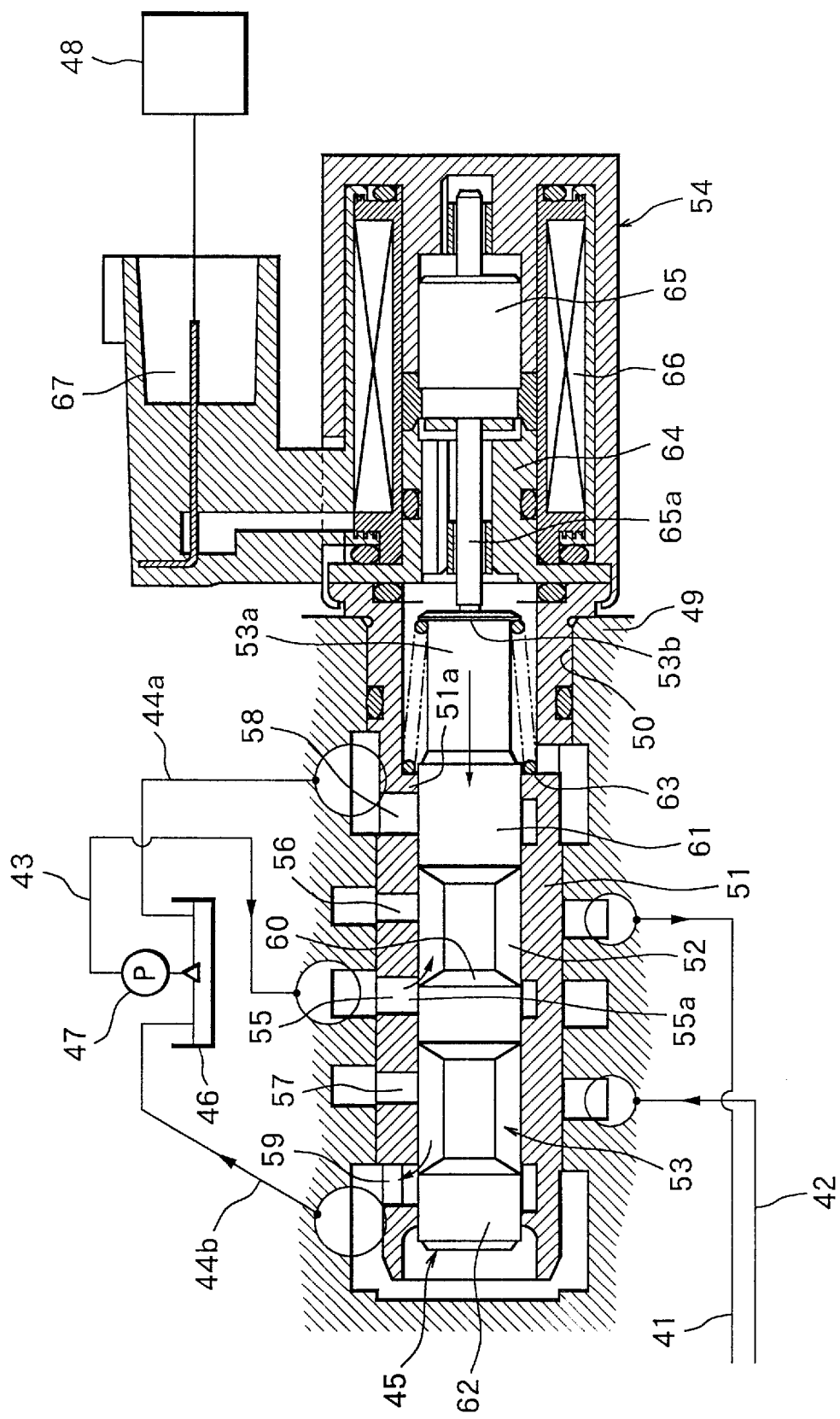
FIG. 6 is a longitudinal sectional view showing an electromagnetic switching valve in the valve timing control mechanism.

In more detail, as shown in FIG. 4 to FIG. 6, the electromagnetic switching valve includes a cylindrical body 51 inserted into and fixed to a holding bore 50 of the cylinder block 49, a spool valve body 53 which is slidable inside a valve bore 52 of the valve body 51 and switches flow path, and a proportional solenoid electromagnetic actuator 54 operating the spool valve body 53.

The valve body 51 includes a supply port 55 penetrated at the substantially central position of the peripheral wall therein which makes communication between a downstream end of the supply passage 43 and the valve bore 52, and a first port 56 and a second port 57 penetrated therein at both sides of the supply port 55 communicating other ends of the first oil pressure passage 41 and the second oil pressure passage 42 and the valve bore 52. At both ends of the peripheral wall a third port 58 and a fourth port 59 are penetrated communicating both drain passages 44a and 44b and the valve bore 52.

The spool valve body 53 includes a substantially cylindrical first valve portion 60 opening and closing the supply port 55 at the center of a small diameter axis and substantially cylindrical second, third valve portions 61, 62 at its ends therein opening and closing the third port and the fourth port 58, 59. The spool valve body 53 is urged in the right direction of the figure by a conical valve spring 63 disposed in compressive state between a cap portion 53b in one end of a support axis 53a at its front end and a spring sheet 51a at an inner wall of the front end of the valve bore 52 so that at the first valve portion 60 the supply port 55 and the second oil pressure passage 42 are communicated.

The electromagnetic actuator 54 is equipped with a core 64, a moving plunger 65, a coil 66, a connector 67 and the like. At the front end of the moving plunger is fixed a driving rod 65a pressing a cap portion 53b of the spool valve body 53.

The controller 48 detects present operating conditions (load, rotation) by a signal from a rotation sensor 101 detecting an engine rotation speed and by a signal from an airflow meter 102 detecting an intake air amount, and detects rotation phase of the camshaft 2 relative to the crankshaft, that is, relative position of the rotation direction of the cam sprocket 1 and the camshaft 2 by signals from the crank angle sensor 103 and the cam sensor 104.

The controller 48 controls electricity to the electromagnetic actuator 54 based on a duty control signal.

For example, when the controller 48 outputs a control signal (off signal) with a duty ratio of 0% to the electromagnetic actuator 54, the spool valve body 53 moves to the right direction at a maximum by spring force of the valve spring 63 as shown in FIG. 4. By this the first valve portion 60 opens an opening end 55a of the supply port 55 for communicating with the second port 57 and at the same time the second valve portion 61 opens an opening end of the third port 58 and the fourth valve portion 62 closes the fourth port 59. Therefore, operating oil pressurized from a oil pump 47 is sent to the retard oil pressure chamber 33 through the supply port 55, a valve port 52, the second port 57 and the second oil pressure passage 42 and operating oil of the advance oil pressure chamber 32 is discharged to the oil pan 46 from the first drain passage 44a through the first oil pressure passage 41, the first port 56, a valve bore 52, and the third port 58.

Accordingly as an inner pressure of the retard oil pressure chamber 33 is high and that of the advance oil pressure chamber 32 is low, the rotation member 3 rotates in one direction at a maximum through the vanes 28a to 28d. With this, the cam sprocket 1 and the camshaft 2 rotates one side relatively and change their phase, resulting in that an opening time of the intake valve is delayed and overlapping with the exhaust valve gets smaller.

On the other hand, when the controller 48 outputs a control signal (ON signal) with a duty ratio of 100% to the electromagnetic actuator 54, the spool valve body 53 slides in the left direction at a maximum against spring force of the valve spring 63 as shown in FIG. 6, the third valve portion 61 closes the third port 58, and at the same time the fourth valve portion 62 opens the fourth valve port 59 and the first valve port 60 communicates the supply port 55 and the first port 56. Therefore, the operating oil is supplied to the advance oil pressure chamber 32 through the supply port 55, the first port 56, and the first oil pressure passage 41. And the operating oil of the retard oil pressure chamber 33 is discharged to the oil pan 46 through the second oil pressure passage 42, the second port 57, the fourth port 59, and the second drain passage 44b. The oil pressure of the retard oil pressure chamber 33 gets lower.

Therefore, the rotation member 3 rotates in the other direction at a maximum through the vanes 28a to 28d, by which the cam sprocket 1 and the camshaft 2 rotate in the other side relatively and change their phase, resulting in that opening timing of an intake valve gets earlier (advanced) and overlapping with an exhaust valve gets larger.

The controller 48 makes as base duty ratio the duty ratio at the position where the first valve portion 60 closes a supply port 55, the third valve portion 61 closes the third port 58, and the fourth valve portion 62 closes the fourth port 59 and on the other hand sets a feedback correction component duty by sliding mode control to make relative position of rotation (rotation phase) between the cam sprocket 1 and the camshaft 2 detected based on signals from a crank angle sensor 103 and a cam sensor 104 to be in accordance with a target value (target advance value) of the relative position of rotation (rotation phase) set corresponding to operating conditions, and makes a final duty ratio (VTCDTY) an additional result of the base duty ratio (BASEDTY) and the feedback correction component (UDTY) and outputs control signal of the duty ratio (VTCDTY) to the electromagnetic actuator 54. In addition, the base duty ratio (BASEDTY) is set at about a central value (for example, 50%) in the duty range within which the supply port 55, the third port 58 and the fourth port 59 all close and there is no supply and no discharge of oil in both of the oil pressure chambers 32, 33.

That is, in the case the relative position of rotation (rotation phase) is required to change into the direction of retard, the duty ratio decreases by feedback correction component (UDTY), operating oil pressurized from an oil pump 47 is supplied to the retard oil pressure chamber 33, and operating oil of the advance oil pressure chamber 32 is discharged to the oil pan 46. On the other hand, in the case the relative position of rotation (rotation phase) is required to change into the direction of advance, the duty ratio increases by the feedback correction component (UDTY), operating oil is supplied to the advance oil pressure chamber 32, and operating oil of the retard oil pressure chamber 33 is discharged to the oil pan 46. In the case of holding the relative position of rotation at the then-state, with reduction of an absolute value of the feedback correction component (UDTY), the duty ratio is controlled to be back close to the base duty ratio and closing of the supply port 55, the third port 58, and the fourth port 59 (cease of supply and discharge of oil pressure) functions to hold the inner pressure of each of the oil pressure chambers 32, 33.

The feedback correction component (UDTY) will be calculated by sliding mode as follows. In the following the relative position of rotation (rotation phase) between a cam sprocket 1 and a camshaft 2 to be detected will be explained as an actual angle of a valve timing control apparatus (VTC) and its target value will be explained as a target angle of VTC.

1. Calculation of Mathematics Model

Since in sliding mode control parameters of a controller is determined based on a mathematics model of a control object, firstly the mathematics model of VTC is calculated. There are various ways to determine a mathematics model such as equations of motion and system identification. Herein is used a system identification.

Input u(k): duty,

Output y(k): actual angle of VTC

The following function is obtained by system identification.

$$G(s) = b/(s^2 + a_2 \cdot s + a_1)$$

2. Simplification of Transfer Function

Simplification of transfer function is carried out because a model determined by system identification may be a multiple model and constitution of a controller is to be simplified.

$$G(s) = b/\{s(s+a_2)\} \tag{2.1}$$

3. Calculation of State Equation

A differential equation of VTC by the determined transfer function is given as follows.

x: actual angle of VTC, u: input (duty)

$$\ddot{x} = -a_1 - a_2\dot{x} + bu = f(x, \dot{x}) + bu \tag{3.1}$$

State of Equation $$\dot{x} = Ax + Bu \tag{3.2}$$

An assignment of the differential equation (3.1) to (3.2) is as follows.

$$\begin{bmatrix} \dot{x} \\ \ddot{x} \end{bmatrix} = \begin{bmatrix} 0 & 1 \\ -a_1 & -a_2 \end{bmatrix} \begin{bmatrix} x \\ \dot{x} \end{bmatrix} + \begin{bmatrix} 0 \\ b \end{bmatrix} u$$

4. Designs of Switching Function

Since a sliding mode control switches a feedback gain corresponding to system conditions, this switching function is placed as follows.

$$S = \alpha_1 x + \alpha_2 \dot{x}$$

A design of a switching function is very important since there is the case that a sliding mode does not occur by parameters of the switching function. Design methods are mainly as follows.

① Design method using polar arrangement method
② Design method of optimum switching super flat plane
③ Design method using 0 point of the system
④ Design method of super flat plane by frequency rectification By determining $\alpha_1$, $\alpha_2$ based on the above methods to obtain $\gamma$ when $\alpha_1:\alpha_2=\gamma:1$, the switching function S is as follows.

$$S = \left(\gamma + \frac{d}{dt}\right)x = \gamma x + \frac{dx}{dt}$$

However, as above, the switching function designed based on an ordinary textbook is function of an actual position of a control object that is an actual angle of VTC, which is not appropriate for a valve timing control apparatus as follows.

First, in the case a target angle of VTC is a value except 0 degree, $\gamma x$ always has a positive value and has no relation with a target value and an actual value. So VTC does not converge to the target angle.

When an electromagnetic switching valve in the range of the dead band, VTC does not operate. Therefore, an actual velocity dx/dt does not change. Accordingly when VTC operates by a very small angle, it does not have a quick response.

In the design based on a textbook, it is preferable that integral terms of an error amount should be added. In this case when a camshaft gets a target angle, the integral term is left a value except 0, and functions to prevent convergence to the target angle.

Therefore, a switching function is set as function of an error amount as follows.

$$S = \left(\gamma + \frac{d}{dt}\right)\tilde{x} = \gamma\tilde{x} + \frac{d\tilde{x}}{dt}$$

$\gamma$: inclination
$\tilde{x}$: error amount of VTC=target angle of VTC−actual angle of VTC Herein in the design of the switching function is employed a design method using 0 point of the system of ③. The 0 point of the system is a method which sets 0 point of (S, A, B) a left half surface on complex plane. (S: switching function, A, B: constant of formula (3.2))

5. Calculation of Sliding Condition

The most simple condition to establish sliding is S·dS/dt<0.

Only when S decreases, the above condition is met. Since S has an error amount and differential value of the error amount as variables, on the above condition being met, it means decrease of the errors and converge to a target value.

First the formula necessary for development of S is determined.

A control amount u is set as follows.

$$u = b^{-1}\{\hat{u} - k\,sgn(S)\} \quad (5.1)$$

This is assigned to the formula (3.1).

$$\ddot{x} = f + b\,b^{-1}\{\hat{u} - k\,\text{sgn}(S)\} \quad (5.2)$$
$$= f + \hat{u} - k\,\text{sgn}(S)$$

Next, since a hat u is developed which is an input on sliding, S=dS/dt=0.

$$\dot{S} = \left(\gamma + \frac{d}{dt}\right)\tilde{x} = 0 \cdot \gamma\tilde{x} + \frac{d}{dt}\tilde{x} = 0$$

$$\ddot{\tilde{x}} + \ddot{x} - \ddot{x}_d = 0$$

$$\ddot{x} = \ddot{x}_d - \ddot{\tilde{x}} = f + bu$$

Herein, $$bu = \hat{u}$$

$$\hat{u} = -f + \ddot{x}_d - \ddot{\tilde{x}} \quad (5.3)$$

The sliding condition S·dS/dt<0 is to be reviewed.

$$\dot{S} = \left(\gamma + \frac{d}{dt}\right)\tilde{x}$$
$$= \ddot{x} - \ddot{x}_d + \gamma(\dot{x} - \dot{x}_d)$$

From formulas (5.2), (5.3)

$$\ddot{S} = f - f + \ddot{x}_d - \gamma\,\dot{x} - k\,\text{sgn}(S) - \ddot{x}_d + \gamma\,\dot{x}$$
$$= k\,\text{sgn}(S)$$
$$S \cdot \dot{S} = -S \cdot k\,\text{sgn}(S)$$
$$= -|S|k < 0$$

Accordingly, when k is made a positive value, sliding is established.

6. Design of Control Amount Calculation Formula

A control amount (feedback correction amount) u is as follows based on formulas (5.1), (5.3).

$$u = b^{-1}\{-f + \ddot{x}_d - \gamma'x - k\,sgn(S)\} \quad (6.1)$$

When formula (2.1) simplifying transfer function is used, the state of equation is as follows.

$$\ddot{x} = -a\dot{x} + bu \quad (6.2)$$

Using the state of equation of (6.2), formula (6.1) is as follows.

$$u = b^{-1}\{-f - \gamma\,\dot{x} - k\,\text{sgn}(S)\}$$
$$= b^{-1}\{a\,\dot{x} - \gamma\,\dot{x} - k\,\text{sgn}(S)\}$$
$$= b^{-1}\{(a - \gamma)\,\dot{x} - k\,\text{sgn}(S)\}$$

Herein, $$\alpha = b^{-1}(a-\gamma),\ k' = b^{-1}k$$
$$u = \alpha\dot{x} - k'sgn(S)$$

This formula is a formula to guarantee sliding and moving along the switching line (S=0).

However, in the control amount designed as above (as in the textbook), since there is no supply and no discharge of oil when in the dead band, operating velocity dx/dt=0→a linear term=0, resulting in that the linear term will not function effectively.

Therefore, the following process is carried out so that a linear term functions effectively even on the dead band.

Namely, β·S (β is constant) is added to the formula of the above control amount u. Herein, when sliding on a switching line (s=0), β·S≈0. Then an addition of β·S to control amount u has no influence on sliding.

$$u = \alpha\,\dot{x} - \beta\,S - k'\text{sgn}(S)$$
$$= \alpha\,\dot{x} - \beta\left(\gamma + \frac{d}{dt}\right)\tilde{x} - k'\text{sgn}(S)$$

Herein, $$\beta' = \beta\gamma,\ \alpha' = \alpha + \beta$$
$$u = -\beta\dot{\tilde{x}} - \alpha'\dot{x} - k'sgn(S)$$

$$u = c \times (\text{VTC target angle}) - \text{VTC actual angle} +$$

$$\underbrace{d \times \frac{d(\text{VTC actual angle})}{dt}}_{\text{linear factor}} \quad \underbrace{-K\frac{S}{|S|}}_{\text{non-linear factor}}$$

Thus as a result of the above addition process, the linear term of the control amount includes an error amount (PERR) of VTC. With this, proper transfer velocity to the switching line is given by the linear term even when entering into an operation dead band and good sliding is secured on the switching line, resulting in convergence to a target angle with a good response characteristic.

Herein coefficients c and d are determined by using a design (determined by response characteristic and stability) of an ordinary linear control system. For example, coefficient c can be determined by 90% response time of an actual valve timing control apparatus and the excessive amount. Coefficient d is set to an appropriate value not to dissipate because it does not converge and generates hunching when too large.

Coefficient K is set to a positive value which is given a maximum value within a range of no hunching not to generate hunching due to being too large.

7. Design of Prevention of Chattering

As a non-linear term UnL=-k·S/|S|=-ksgn(S) is used in a digital control device, a sampling cycle can not become infinitely small, and it does not slide on a switching surface and generates chattering.

Figure 7A:
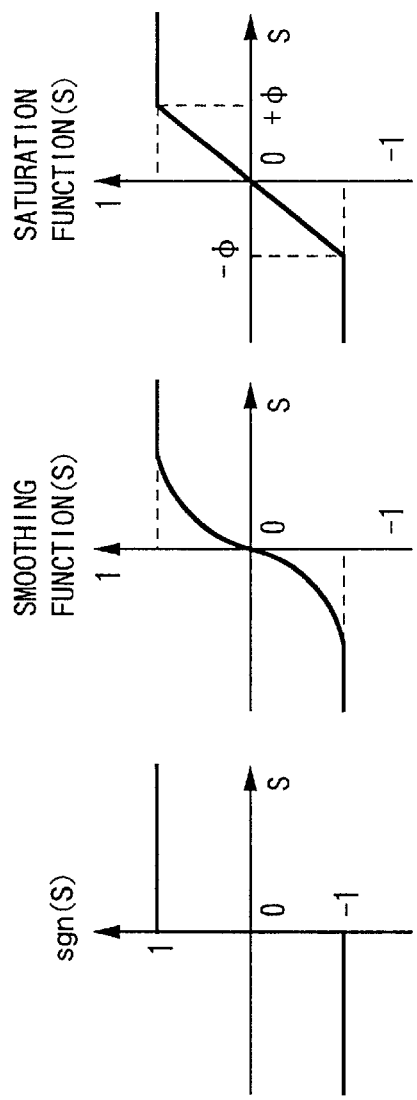
FIGS. 7A and 7B are drawings showing forms of function used for a non-linear term in a sliding mode control according to the first embodiment.
Figure 7B:
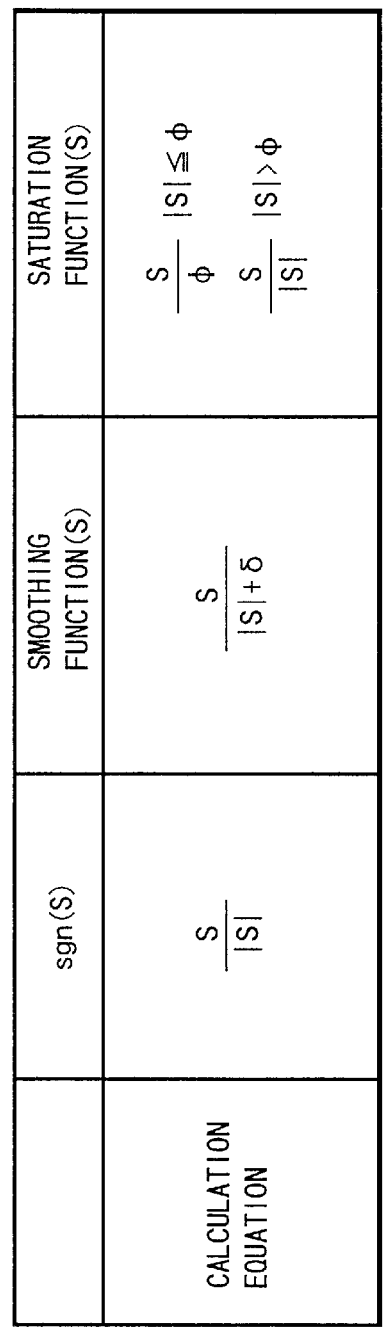

Therefore decrease of chattering is conducted by using saturation function and flat sliding function. These functions are shown in FIG. 7.

Both of them can be used, but the flat sliding function can be used easier because its calculation formula is simple compared with the saturation function.

Figure 8:
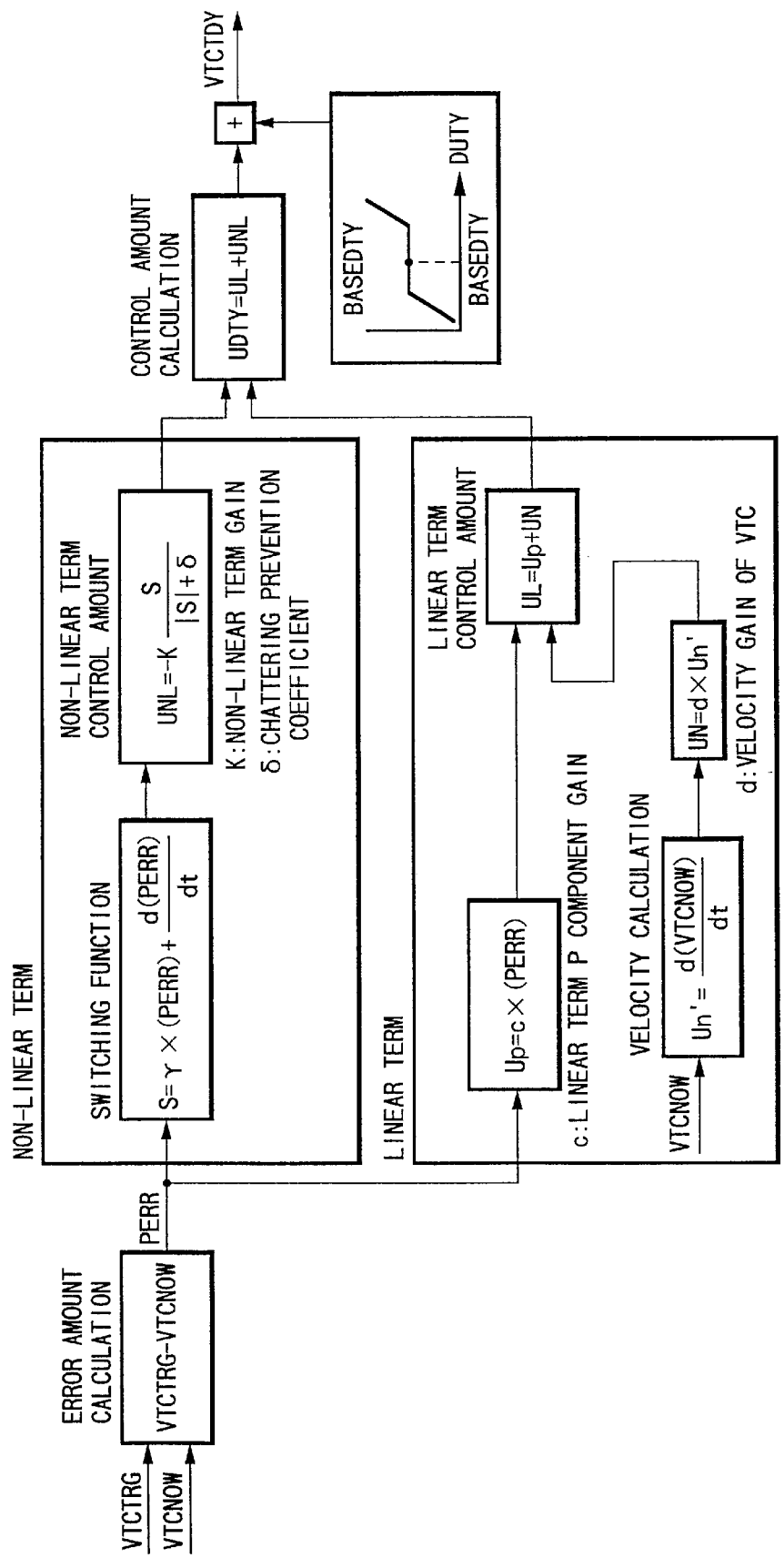
FIG. 8 is a control block diagram according to the first embodiment.

FIG. 8 is a block diagram a state of a duty control of an electromagnetic actuator 54 by the controller 48 to the above designed sliding mode control is applied.

$VTCTRG$(target angle)$-VTCNOW$(actual angle)$=PERR$(error amount).

$Up$(proportional control amount)$=c$(proportional component gain)$\times PERR$(error amount)

$UN$(velocity control amount)$=d$(velocity gain of VTC)$\times Un'$(actual velocity of $VTC$)

$UL$(linear term control amount)$=Up+UN$ $S$(switching function)$=PERR$(error amount)$\times \gamma$(inclination)$+d(PERR)/dt$(differential value of error amount).

A non-linear term control amount UNL is calculated as a flat sliding function using the switching function S.

$UNL=-kS(|S|+\delta)$

Figure 9:
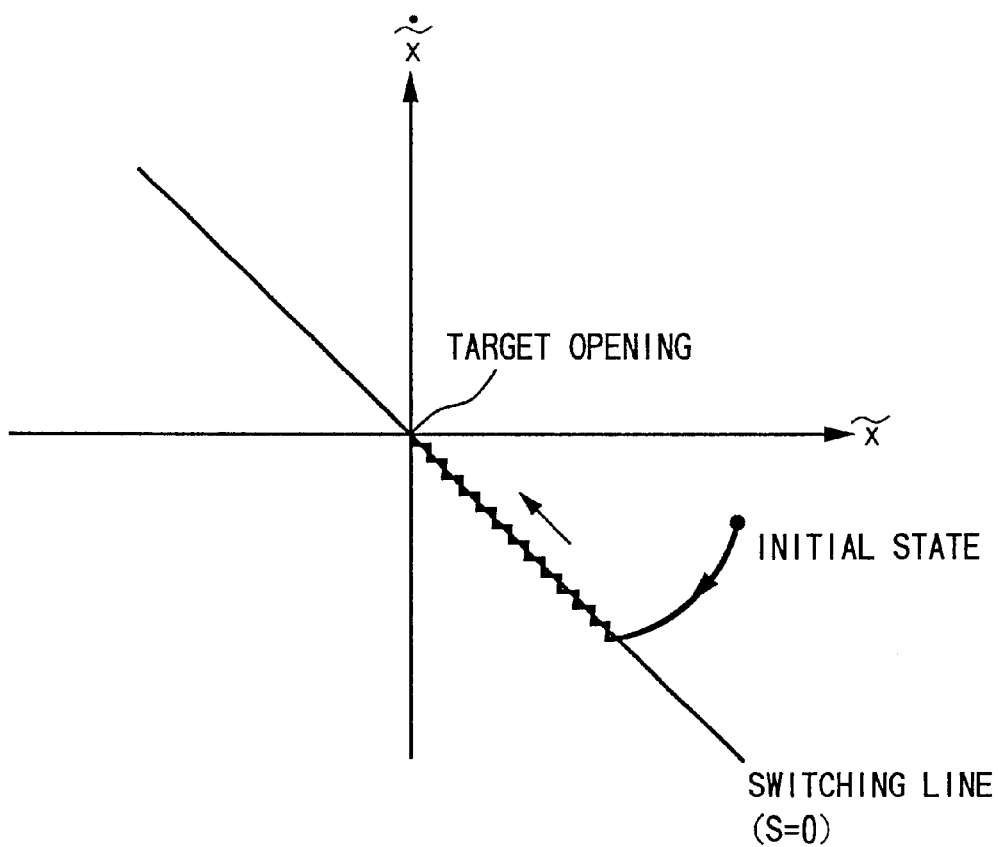
FIG. 9 is a time chart showing a state of convergence to a target angle on sliding mode control according to the first embodiment.

The above linear term control amount UL modifies velocity of a state of a control system (VTC) coming close to a switching line (S=0). The non-linear term control amount UNL generates sliding mode along the switching line. This makes the VTC move on the switching line (S=0) on the phase surface from an initial state. When VTC state gets on the switching line, it reaches an original point (target value) bindingly sliding on the switching line (S=0). (see FIG. 9).

And a control amount UDTY (feedback correction component) is calculated as addition of the linear term control amount UL and the non-linear term control amount UNL and the outcome as addition of the feedback correction component UDTY and a base duty ratio BASEDTY equivalent to the above dead band neutral position is outputted as a final duty ratio VTCDTY.

Thus since a feedback correction amount is calculated by sliding control, a feedback gain is switched to lead the state of the control system on the preset switching line, the control having no disturbances by oil temperature and oil pressure, and with high robust can be carried out.

In particular, setting a linear term of the control amount as a function of the error amount does not require a complicate dither to go beyond the operation dead band of a switching valve or reduces dependence on it and enables simplification of matching to save capacities of ROM and RAM.

And reduction of influence of the above dead band leads to release the dimensional tolerance of the dead band width and reduction of machining costs.

In the above embodiment a linear term is set with a term proportional to an operation velocity of VTC in addition of the term proportional to the error amount. When being out of an operation dead band, addition of transfer velocity adjustment function to a switching line by the proportional term to the operation velocity enables proper transfer velocity and better response.

Figure 10:
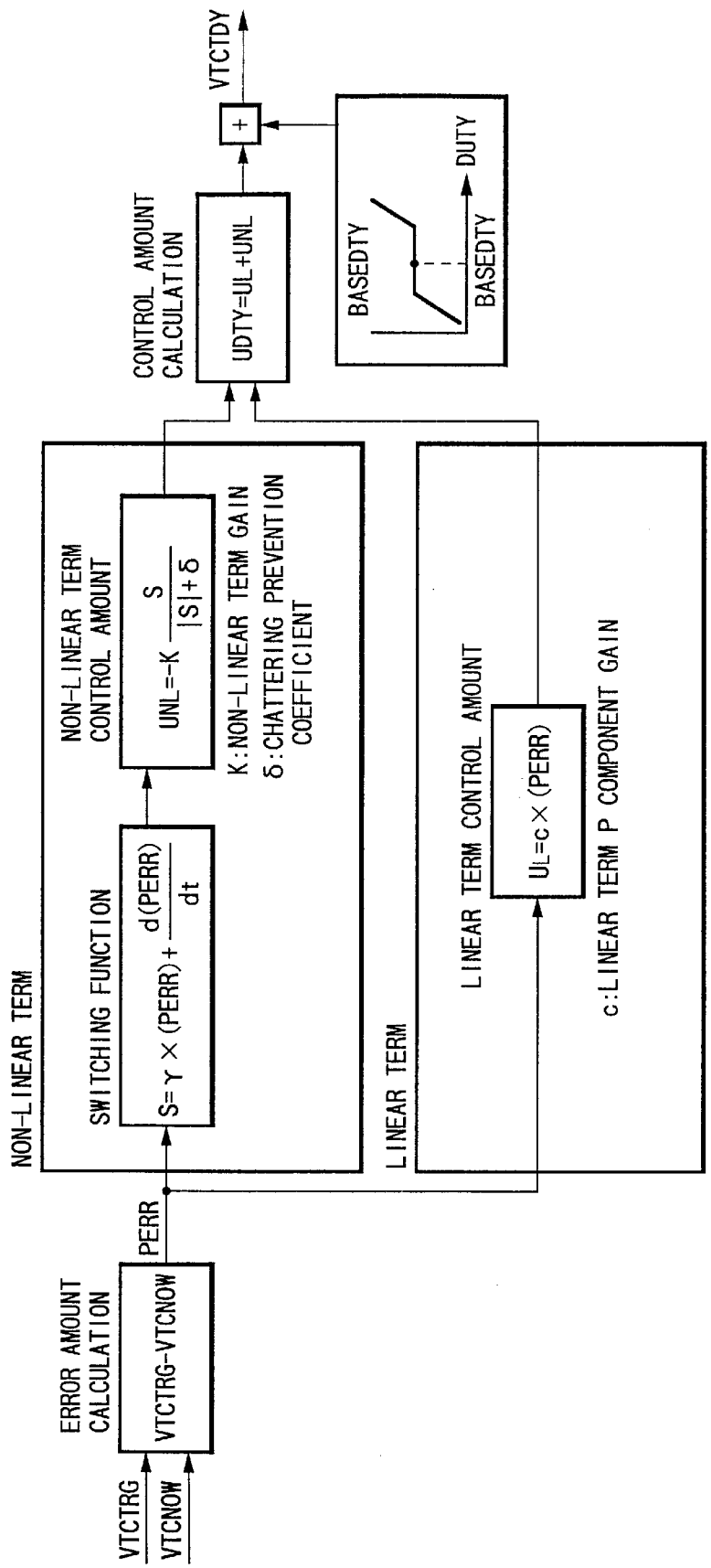
FIG. 10 is a control block diagram according to the second embodiment.

However, in the case the linear term of the control amount is set only by the term proportional to an error amount, not only on entering into operation dead band but also being out of operation dead band, proper transfer velocity is given to a switching line. Therefore, sliding mode control is realized and in this case omission of the proportional term to an operation velocity enables to save a program capacity by simple control calculation. A control block diagram according to the second embodiment like this is shown in FIG. 10.

The present invention can be applied, not limited to the VTC using the vane type oil pressure actuator, to the VTC wherein rotation phase of a camshaft varies by conversion of linear motion to rotation using a linear type oil pressure actuator and also is not limited to an oil control type as long as a control object has a dead band. This applies to the following embodiment.

Next, the embodiment of the invention using both sliding mode control and dither control will be explained.

In the third embodiment a feedback correction component (UFBDTY) will be calculated as in the following using both sliding mode control and dither control.

Figure 11:
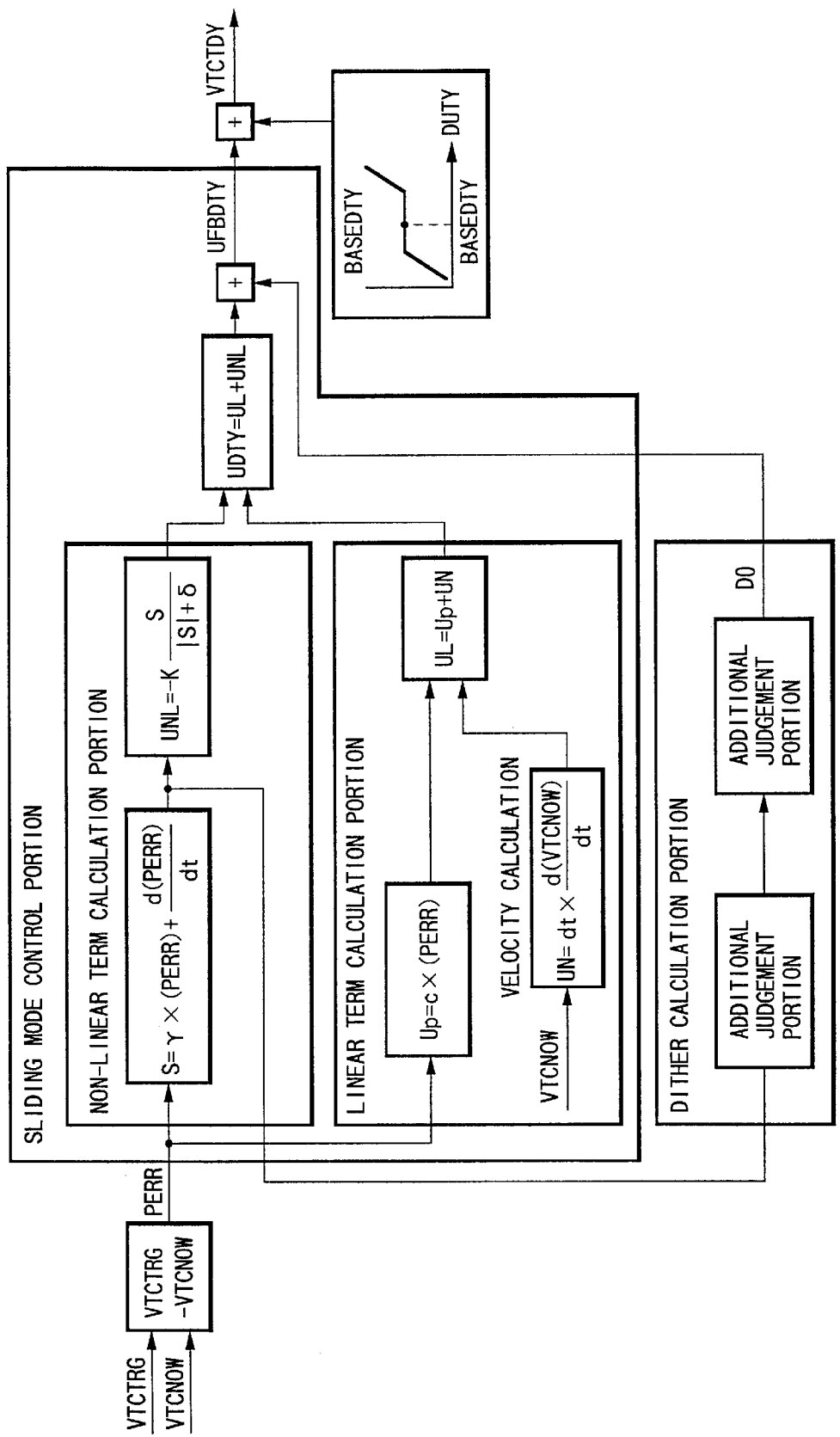
FIG. 11 is a control block diagram according to the third embodiment.
Figure 12:
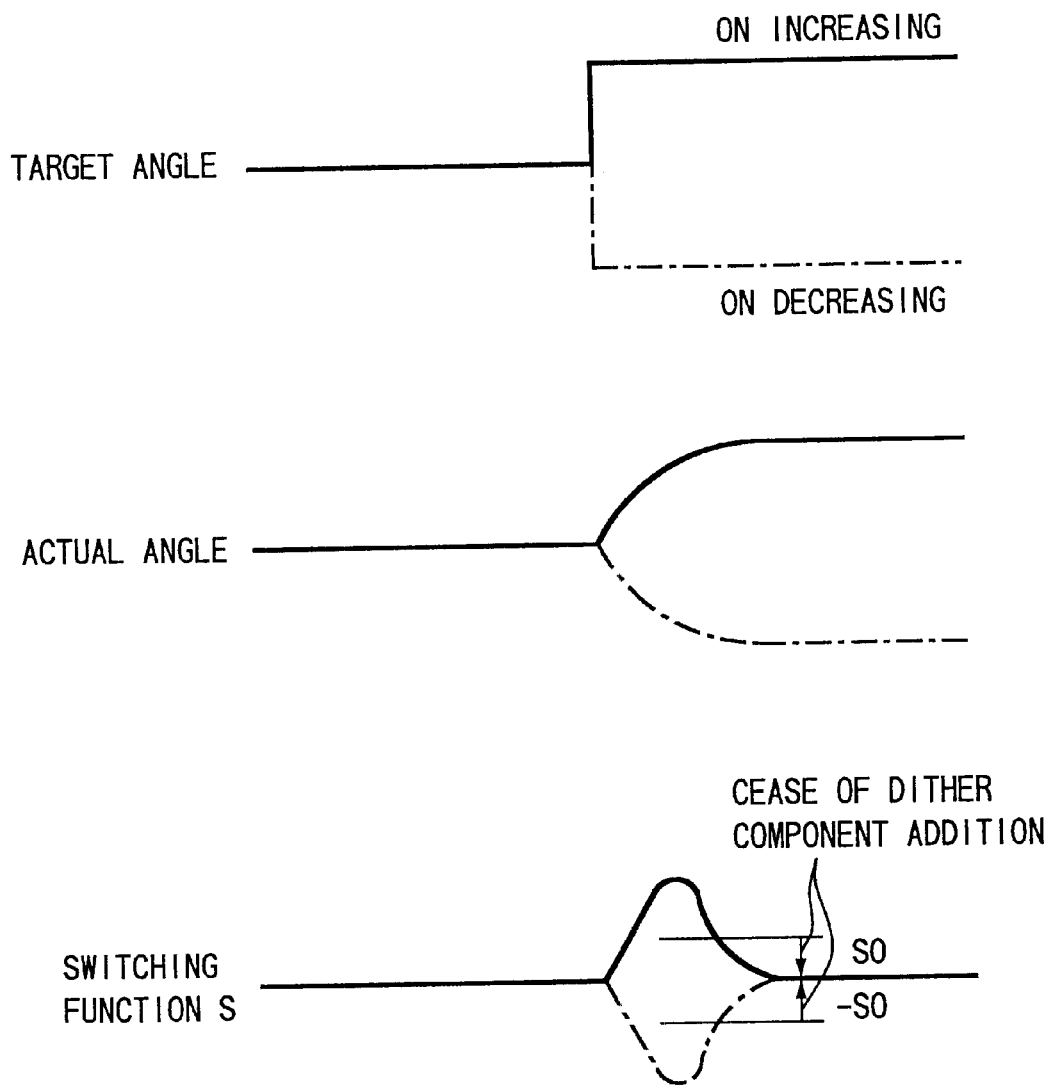
FIG. 12 is a drawing showing variation of a switching function on sliding mode control and if a dither component is added based on the variation.

FIG. 11 is a block diagram showing process of duty control of an electromagnetic actuator 54 by the controller 48 applying sliding mode control and dither control designed as above.

First, in a sliding mode control process, like the same as the first embodiment, a linear control amount UL is calculated in the linear term calculation process, and a non-linear control amount UNL is calculated in the non-linear control calculation process. A total control amount in sliding mode control UDTY is calculated by addition of UL and UNL (in the first embodiment the control amount UDTY is used as the feedback control amount without any change).

On the other hand, the addition judgement portion of the dither control process determines if a dither component (correction amount) is added based on the switching function. In detail, when $S \times \Delta S \geq 0$ or $|S| \geq S0(>0)$ dither component D0 is added. When other than that, namely, $|S|<S0$, addition of dither component D0 stops. That is D0=0. After the addition judgement is made like this, the dither component D0 is outputted from the output portion.

That is, as a target angle of VTC changes during the state where a switching valve is in the dead band, the actual angle does not change during a time period until the switching valve is out of the dead band. Therefore, the deviation and a switching function S continue to increase and then $S \cdot \Delta S \geq 0$. Accordingly during this period, a dither is added without any condition so that the switching valve gets out of the dead band quickly and VTC starts to move quickly.

When the switching valve is out of the dead band and VTC starts to move, the deviation and the switching function begin to decrease. Until VTC gets close to a target angle to some degree, namely, when $|S| \geq S0$ is satisfied, an addition of the dither component enables quick approach to the target angle to secure high response characteristic.

When VTC gets close to a target angle and $|S|<S0$, an addition of the dither component stops, resulting in restraining overshooting by excessive control amount and quick convergence to the target angle.

When the deviation PERR (target angle−actual angle) is a positive value, the dither component D0 is set to the value in the direction of increasing an actual angle (for example, positive value). When the deviation is a negative value, the dither component D0 is set to the value in the direction of decreasing an actual value (for example, negative value).

The value of the dither component D0 is set large enough to get out of a dead band in the case of PIT control but in the present invention the non-linear term of sliding mode control sufficiently conducts the function of the dither control and the dither component D0 can be set to the level of the value with the ability of fine adjustment function. But the dither component D0 can set large enough and the non-linear term of the sliding mode control can be adapted to adjust variation components required by oil temperature and oil pressure.

A feedback correction component UFBDTY is calculated by adding a total control amount of the sliding mode control UDTY to a dither component D0 in the dither control (D0=0 on stop of addition). The feedback correction component UFBDTY is added to a base duty ratio which is equivalent of a neutral position of the dead band, and the additional result is output as a final duty ratio VTCDTY.

Thus basically by a sliding mode control a control with high robust can be done without disturbances caused by oil temperature and oil pressure. Since a machining accuracy of components can be lowered, machining costs are reduced and with an adjustment function by correction of a dither control, control performance such as obtaining the best response is improved.

A load of the dither control is reduced compared with a case when the dither control is adopted to a conventional PID control and addition judgment conditions of the dither component can be simpler with a complicate addition judgment including conventional oil temperature and oil pressure. In particular, in the addition judgment of the dither component based on a switching function S calculated as functions of the deviation PERR as this embodiment, the dither components can be added corresponding to the deviation only when necessary and calculation loads for judgment can be reduced by carry-over of the switching function. And also setting of addition conditions of a dither component based on the switching function as above, as well as a linear term in the sliding mode control (for example, set proportional to deviation) make the control state quickly get close to the a switching line (S=0) while restraining overshooting, to start sliding mode on the switching line. Besides this, the dither component can be added based on deviation PERR, for example, when PERR·ΔPERR≧0 or |PERR|>PERR0 (>0).

With this, the entire control can be simplified including sliding mode control and ROM and RAM capacities can be saved.

Next, the invention of learning influence of components variations and aging will be explained. The influences of the component variations and aging will be explained before an explanation of the embodiment of the present invention.

Figure 13:
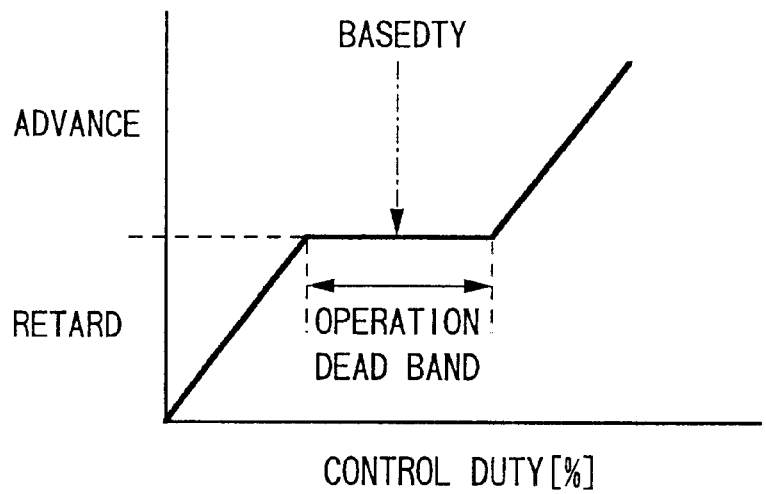
FIG. 13 is a drawing showing a state where a base duty ratio is exactly corresponding to a central value of an operation dead band.

As described above, in the case a sliding mode control is applied to the device having an operation dead band, as shown in FIG. 13, a basic control amount (for example, control duty=50%) is set to a value corresponding to the central value of the operation dead band and the feedback control is started by adding the feedback control amount to go beyond the operation dead band to the basic control amount. When the deviation between the target angle and the actual angle of a valve timing control apparatus gets within a predetermined amount of the control dead band, the feedback control is ceased (feedback control amount=0). That is, if the feedback control is going to be carried out until the deviation between the target angle and the actual angle reaches 0, since a hunching occurs due to overshooting caused by delay of response, the control dead band is set. Thereby, the actual angle can fully converge to the target angle by the oil amount supplied into an oil pressure chamber of the valve control timing control apparatus during a time period from the feedback control stops after entering into the control dead band to the switching valve (spool valve) completely closes after entering into the operation dead band.

However, the basic control amount may be out of the central positioning the operation dead band of the switching valve due to component variations, aging and the like. For example, in the case the basic control amount is out of the control position as shown in FIG. 14, when a valve timing is going to be controlled in an advance direction on feedback controlling, the control duty gets large required to go beyond the operation dead band and the duty amount reduces by the corresponding amount, causing deterioration of response.

On the contrary, in the case of a retard direction control, the control duty required to go beyond the operation dead band gets small and the duty amount for the advance operation increases by the corresponding amount, resulting in undershoot in a retard side exceeding the target value.

Further, on an advance control, since an opening angle of the switching valve is small when the feedback control stops after entering into the control dead band (even in the case of setting a linear term proportional to deviation, the duty amount to the deviation is the same and so the opening angle reduces by the amount corresponding to the deviated one) and the oil amount supplied to the oil pressure chamber also reduces after the feedback control stops. Therefore, the steady deviation occurs on the retard side to the target angle. By contrast, on the retard control, an opening angle of the switching valve in feedback controlling is large and the influence of the undershoot toward the retard side is left as it is, resulting in that the steady deviation occurs in the retard side than the target angle.

Figure 14:
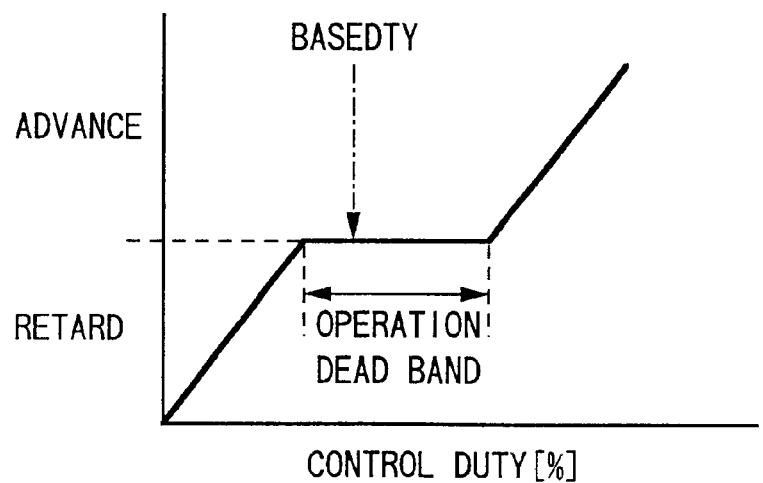
FIG. 14 is a drawing showing a state where a base duty ratio is in the retard side to the central value of an operation dead band.

On the other hand, when being out of the central position in the direction opposed to the direction of FIG. 14 as opposed to the above, a switching valve overshoots into an advance direction than the target angle on an advance control and on a retard control the response deteriorates. Therefore, the constant deviation occurs from the target angle in both the advance and retard controls.

Figure 15:
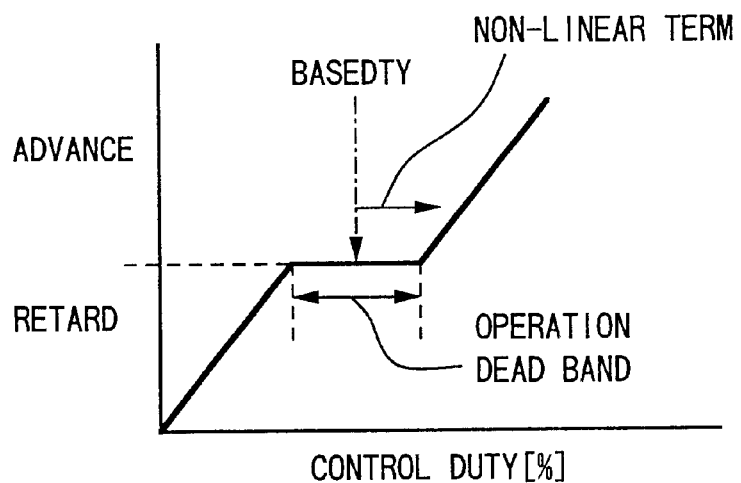
FIG. 15 is a drawing showing a state where an operation dead band is smaller than a non-linear term.

When variations in width of operation dead bands exist other than the above, for example, in a small operation dead band as shown in FIG. 15 a non-linear term of the feedback control amount set by sliding mode control gets relatively large, causing chattering. Namely, since the opening angle of the switching valve is large on the cease of the feedback control after entering into the central dead band, the oil amount supplied to the oil pressure chamber until the time the switching valve closes is increased and the valve timing undershoots into the retard side. In the case of being out of the control dead band, the valve timing is feedback controlled into the advance side, that is chattering.

Figure 16:
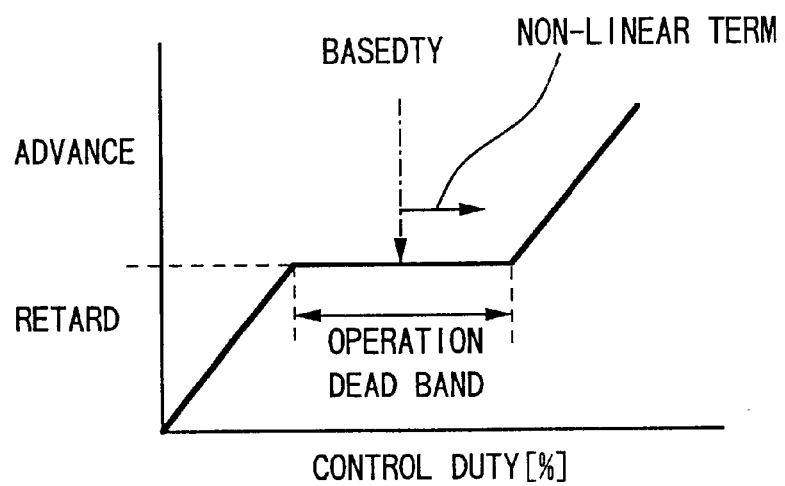
FIG. 16 is a drawing showing a state where an operation dead band is greater than a non-linear term.

By contrast, as an operation dead band is large as shown in FIG. 16, a non-linear term gets smaller relatively, and only by the non-linear term it is impossible to exceed the operation dead band on feedback controlling, resulting in deterioration of response.

The present invention restrains these influences by learning the deviation of the basic control amount to the operation dead band central value and variations in width of operation dead bands.

Figure 17:
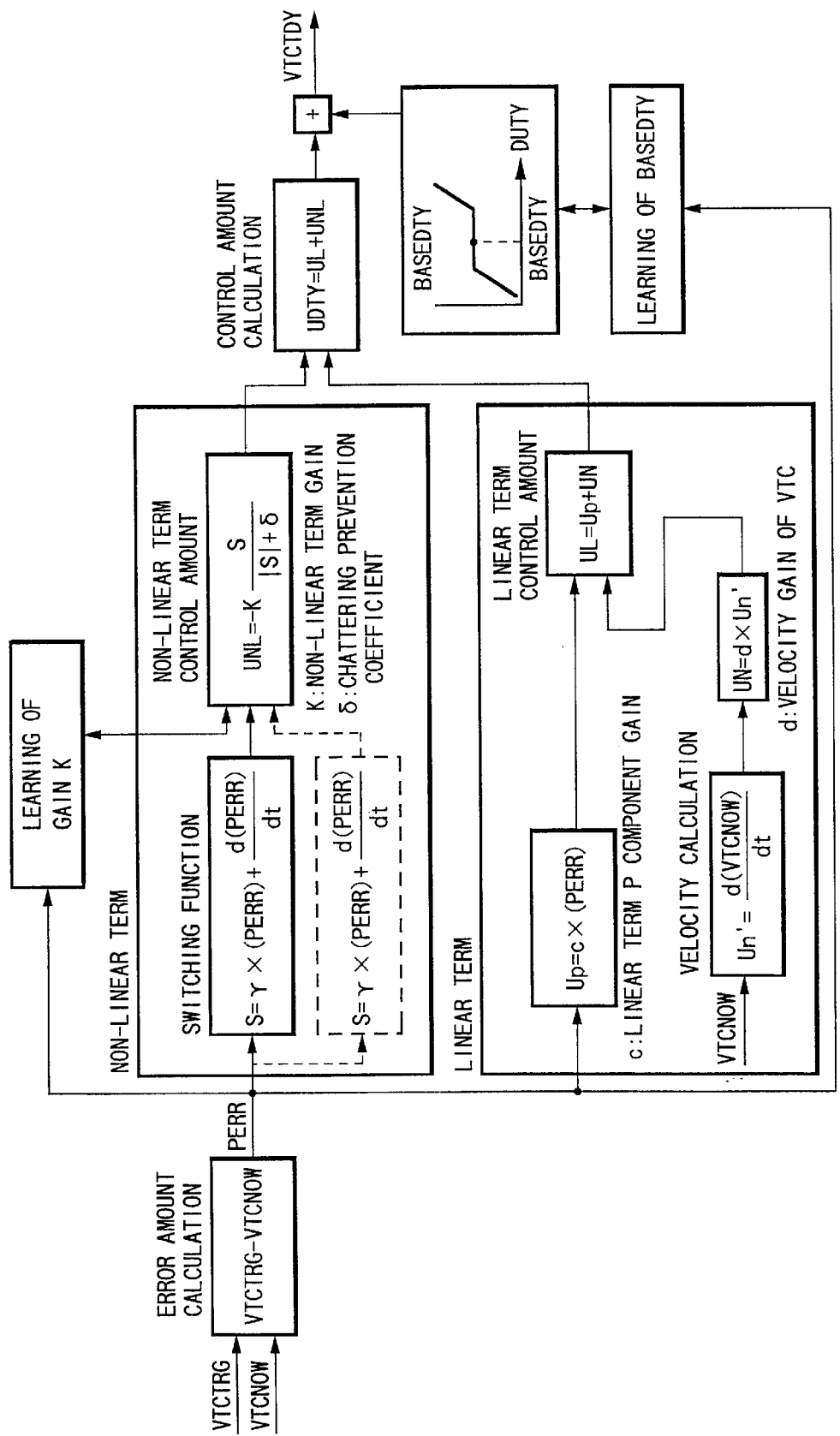
FIG. 17 is a control block diagram according to the fourth embodiment.

FIG. 17 is a block diagram showing a control process of the fourth embodiment according to the above invention.

In a linear term calculation portion, a linear term control amount UL is calculated and in a non-linear term calculation portion, a non-linear term control amount UNL is calculated. A total control amount UDTY is calculated by adding the linear term control amount UL to the non-linear term control amount UNL. This is the same as the first embodiment.

The present invention performs, in addition to the basic sliding mode control, the learning of a base duty ratio BASEDTY as a basic control amount and the learning of velocity gains used for calculation of the non-linear term control amount.

Figure 18:
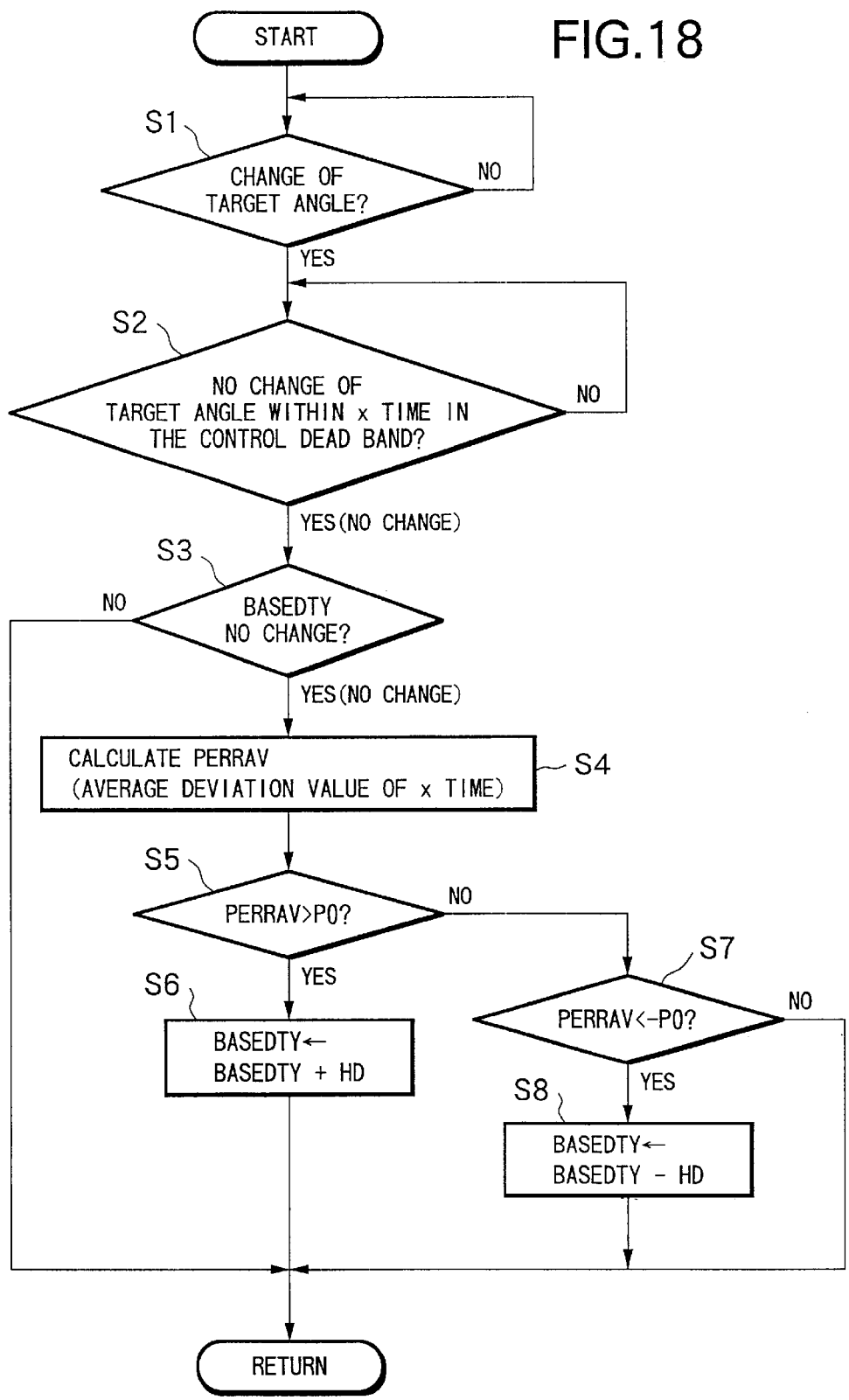
FIG. 18 is a flowchart showing a control to learn and correct a base duty ratio on sliding mode control according to the fourth embodiment.

FIG. 18 is a flowchart showing control for learning and controlling a deviation of the base duty ratio BASEDTY from a central position in the operation dead band.

Step 1 judges if a target angle VTCTRG varies and when judging that the target angle VTCTRG varies and the feedback control is made, the flow goes to Step 2.

In Step 2, it is judged if a target angle VTCTRG does not vary for a predetermined period of time X, after a deviation PERR between a target angle VTCTRG and an actual angle VTCNOW gets within a predetermined range (for example, ±3 degrees) of the control dead band and the feedback control stops, that is, if it is a steady state.

And when it is judged that it is a steady state, the flow goes to Step 3 where it is judged if a base duty ratio BASEDTY is corrected (correction by learning Steps 6,8 as described later). If not, the flow goes to Step 4.

In Step 4, an average value (steady deviation) of the deviation in the predetermined time X is calculated.

In Step 5, it is judged if an average value PERRAV of the deviation PERR exceeds a positive threshold value P0 and if it is judged it does innegligible steady deviation occur in the retard side. As a result, it is judged that the base duty ratio BASEDTY is on the retard side out of a central value of the operation dead band and the flow goes to Step 6 where a predetermined amount of the positive correction duty HD is added to the base duty ratio BASEDTY.

In Step 5, when it is judged that the average value PERRAV of the deviation PERR does not exceed the positive threshold value P0, the flow goes to Step 7 where it is judged if the average value PERRAV of the deviation PERR is below a negative threshold value −P0. When it is judged that the average value PERRAV does not exceed, it is judged innegligible steady deviation occur on the advance side, and as a result of this, the base duty ratio BASEDTY is on the advance side out of the central value of the operation dead band, and the flow goes to Step 8 where the correction duty HD is subtracted from the base duty ratio BASEDTY.

Thus, the base duty is corrected up or down so that the average value PERRAV sets within the threshold value ±P0. With this, the steady deviation can be reduced to the negligible level and the deviation between the base duty ratio and the operation dead band can be sufficiently small, resulting in good response characteristics and quick convergence to a target angle by restraining occurrence of overshooting and undershooting.

Figure 19:
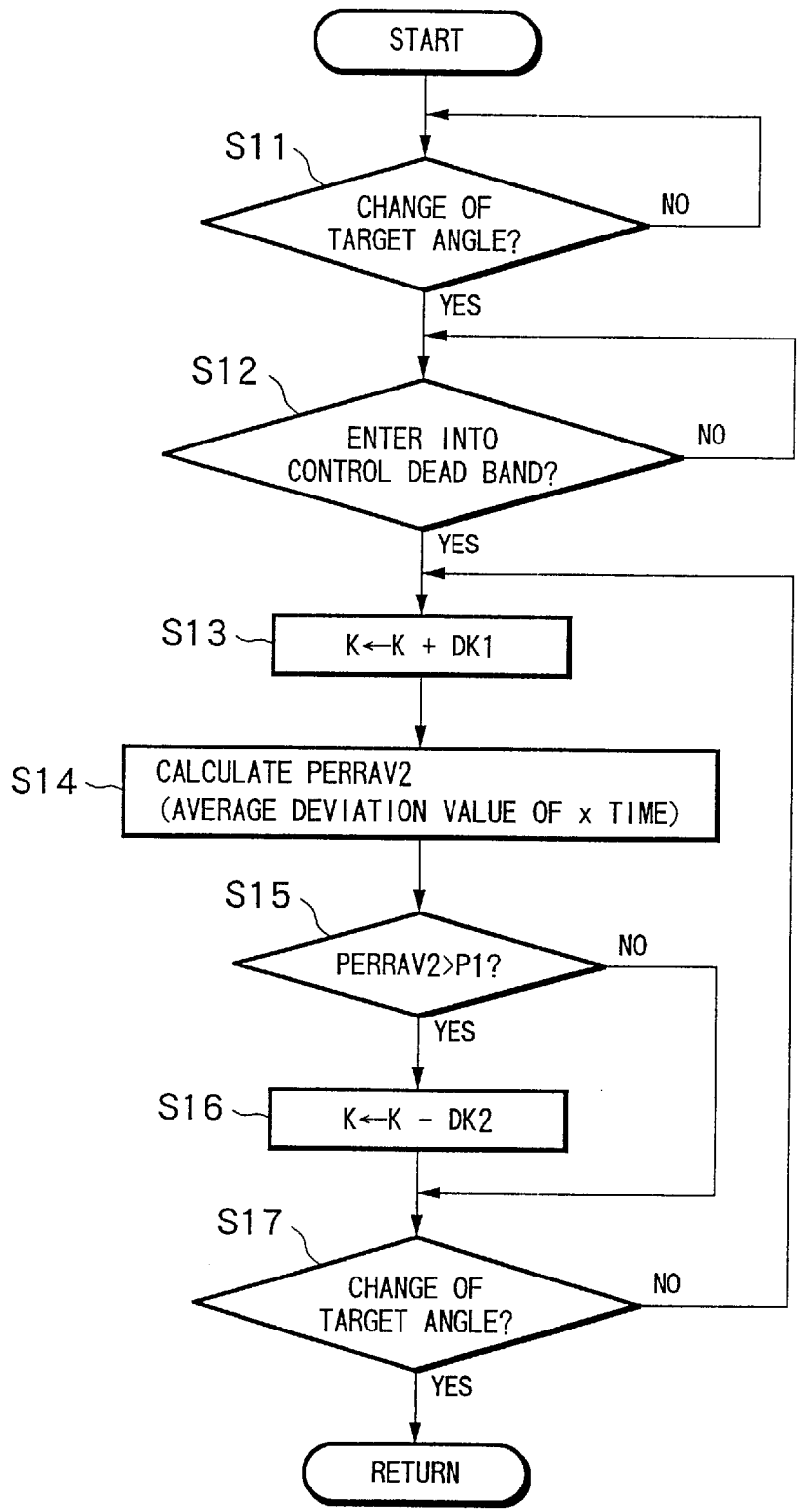
FIG. 19 is a flowchart showing a control to learn and correct a gain of a non-linear term on sliding mode control according to the fourth embodiment.

FIG. 19 shows a flowchart of learning and correcting a gain K of a non-linear term to variations in width of an operation dead band.

After it is judged if the target angle varies in Step 11, then in Step 12, it is judged if it goes within the control dead band.

When it is judged that the target angle goes within the control dead band, the flow goes to Step 13 where a gain K of the non-linear term control amount UNL increases by a predetermined amount DK1 and the feedback control is performed with the increased non-linear term control amount UNL only as the feedback correction component UDTY (a linear term control amount=0).

In Step 14, after the above, an average value PEERAV2 of the deviation PEER during the predetermined time X is calculated.

In Step 15, it is judged if the average value PEERAV2 of the deviation PEER exceeds a threshold value P1.

And when it is judged that it does, the flow goes to Step 16 where the gain K decreases by a predetermined amount DK2.

When it is judged that the average value PEERAAV2 does not exceed, it jumps to Step 17.

In Step 17, it is judged if a target angle VTCTRG of VTC varies. When it is judged that it does not, the flow goes back to Step 13 where the feedback control is performed by increase of the gain K.

With this, the gain K is adjusted so that the average value PEERAV2 of the deviation PEER is maintained in the vicinity of the threshold value P1, while increasing and decreasing the gain K during the steady state of the control dead band.

Accordingly, the non-linear term control amount UNL can be modified to an appropriate amount by adjustment (learning correction) of the above gain K to variations of the operation dead band. As a result, the operation dead band can be gone beyond only by the non-linear term control amount UNL and there is no occurrence of chattering.

The entire contents of Japanese Patent Applications No. 11-313221 filed on Nov. 4, 1999, No. 11-339317 filed on Nov. 30, 1999 and No. 11-348854 filed on Dec. 8, 1999 are incorporated herein by reference.

What is claimed:

1. A sliding mode control apparatus for carrying out a sliding mode control to a control object having an operation dead band to a control amount by a control amount including a linear term set as a function of a deviation between a target position and an actual position of said control object.

2. A sliding mode control apparatus according to claim 1, wherein said control object is an oil pressure control system.

3. A sliding mode control apparatus according to claim 2, wherein said control object is a valve timing control apparatus for continuously varying a rotation phase of a camshaft relative to a crankshaft by an oil pressure control and selectively controlling, by a switching valve, the supply and discharge of oil to an oil pressure actuator to be oil pressure controlled.

4. A sliding mode control apparatus according to claim 1, wherein said linear term of said control amount is set by adding a term proportional to the deviation between the target position and the actual position of the control object to a term proportional to an operation velocity of the control object.

5. A sliding mode control apparatus according to claim 1, wherein said linear term of said control amount is set only by a term proportional to the deviation between the target position and the actual position of the control object.

6. A sliding mode control apparatus for feedback controlling a control object to a target value based on a control amount obtained by correcting, by means of a dither control, a control amount calculated by a sliding mode control, said sliding mode control including the use of a linear term set as a function of a deviation between a target position and an actual position in an operation dead band.

7. A sliding mode control apparatus according to claim 6, wherein a switching function of said sliding mode control is calculated as a function of a deviation between a target value and an actual value of said control object.

8. A sliding mode control apparatus according to claim 7, wherein a condition that a correction amount by said dither control is added is set based on said switching function.

9. A sliding mode control apparatus for feedback controlling a control object to a target value based on a control amount obtained by correcting, by means of a dither control, a control amount calculated by a sliding mode control, wherein a switching function of said sliding mode control is calculated as a function of a deviation between a target value and an actual value of said control object, wherein said switching function is calculated in accordance with the following formula:

$$S = \gamma \times PERR + d(PERR)/dt$$

$\gamma$: inclination

PERR: deviation between a target value and an actual value of said control object d(PERR)/dt: differential value of said deviation.

10. A sliding mode control apparatus according to claim 9, wherein a control amount U in said sliding mode control is calculated in accordance with the following formula:

$$U = c \times PERR + d \times \{d(NOW)/dt\} - K\{S/(|S|+\delta)\}$$

d(NOW)/dt: actual velocity of said control object c, d: constant

δ: chattering prevention coefficient.

11. A sliding mode control apparatus according to claim 9, wherein a condition that said correction amount of said dither control is added is set by the following formula:

$$S \cdot \Delta S \geq 0 \text{ or } |S| \geq S0$$

ΔS: change amount

S0: positive predetermined value.

12. A sliding mode control apparatus for feedback controlling a control object to a target value based on a control amount obtained by correcting, by means of a dither control, a control amount calculated by a sliding mode control, wherein a switching function of said sliding mode control is calculated as a function of a deviation between a target value and an actual value of said control object, wherein said switching function is calculated in accordance with the following formula:

$$S = \gamma \times PERR + d(NOW)/dt$$

γ: inclination

PERR: deviation between a target value and an actual value of said control object d(NOW)/dt: actual velocity of said control object.

13. A sliding mode control apparatus for feedback controlling a control object to a target value based on a control amount obtained by correcting, by means of a dither control, a control amount calculated by a sliding mode control, wherein said control object is a valve timing control apparatus for continuously varying a rotation phase of a camshaft relative to a crankshaft by an oil pressure control and selectively controlling by a switching valve the supply and discharge of oil to an oil pressure actuator to be oil pressure controlled.

14. A sliding mode control apparatus comprising:

a sliding mode control unit operative to provide a feedback control amount calculated to go beyond an operation dead band and to add said amount to a basic control amount set corresponding to a central value of said operation dead band to a control amount of a control object, to start a feedback control, and to stop said feedback control when a deviation between a target value and an actual value of said control object gets within a predetermined control dead band; and wherein said basic control amount is corrected based on a steady deviation between the target value and the actual value of said control object when entering into said control dead bank.

15. A sliding mode control apparatus according to claim 14, wherein a switching function S of said sliding mode control is calculated as a function of the deviation between the target value and the actual value of said control object.

16. A sliding mode control apparatus according to claim 15, wherein said switching function is calculated in accordance with the following formula:

$$S = \gamma \times PERR + d(PERR)/dt$$

γ: inclination

PERR: deviation between a target value and an actual value of said control object d(PERR)/dt: differential value of said deviation.

17. A sliding mode control apparatus according to claim 15, wherein said switching function S is calculated in accordance with the following formula:

$$S = \gamma \times PERR + d(NOW)/dt$$

γ: inclination

PERR: deviation between a target value and an actual value of said control object d(NOW)/dt: actual velocity of said control object.

18. A sliding mode control apparatus according to claim 16, where said feedback control amount U is calculated by the following formula:

$$U = c \times PERR + d \times \{d(NOW)/dt\} - K\{(S/|S|+\delta)\}$$

d(NOW)/dt: actual velocity of said control object c, d: constant

δ: chattering prevention coefficient.

19. A sliding mode control apparatus according to claim 14, wherein said control object is a valve timing control apparatus for an internal combustion engine for continuously varying a rotation phase of a camshaft relative to a crankshaft by an oil pressure control and selectively controlling by a switching valve the supply and discharge of oil to an oil pressure actuator to be oil pressure controlled.

20. A sliding mode control apparatus comprising:

a sliding mode control unit operative to provide a feedback control amount calculated to go beyond an operation dead bank and to said amount to a basic control amount set corresponding to a central value of said operation dead bank to a control amount of a control object, to start a feedback control, and to stop said feedback control when a deviation between a target value and an actual value of said control object gets within a predetermined control dead band; and wherein, when the deviation between the target value and the actual value of said control object gets within a predetermined control dead band, a gain of a non-linear term of said feedback control amount is adjusted so that the deviation between the target value and the actual value becomes within a set range while carrying out the feedback control using only said non-linear term with changing said gain when entering into said control dead band.

21. A sliding mode control apparatus according to claim 20, wherein a switching function S of said sliding mode control is calculated as a function of the deviation between the target value and the actual value of said control object.

22. A sliding mode control apparatus according to claim 21, wherein said switching function S calculated in accordance with the following formula:

$$S = \gamma \times PERR + d(PERR)/dt$$

γ: inclination

PERR: deviation of the target value and the actual value of said control object d(PERR)/dt: differential value of said deviation.

23. A sliding mode control apparatus according to claim 21, wherein said switching function S is calculated in accordance with the following formula $$S=\gamma \times PERR+d(NOW)/dt$$

γ: inclination
PERR: deviation between the target value and the actual value of said control object
d(NOW)/dt: actual velocity of said control object.

24. A sliding mode control apparatus according to claim 22, wherein said feedback control amount U is calculated in accordance with the following formula:

$$U=c\times PERR+d\times\{d(NOW)/dt\}-K\{(S/|S|+\delta)\}$$

d(NOW)/dt: actual velocity of said control object
c, d: constant
δ: chattering prevention coefficient.

25. A sliding mode control apparatus according to claim 20, wherein said control object is a valve timing control apparatus for continuously varying a rotation phase of a camshaft relative to a crankshaft by an oil pressure control, and selectively controlling by a switching valve the supply and discharge of oil to an oil pressure actuator to be oil pressure controlled.

26. A sliding mode control method comprising the steps of:
setting a linear term as a function of a deviation between a target position and an actual position of a control object having an operation dead band to a control amount;
calculating said control amount including said linear term; and
carrying out a sliding mode control to said control object based on said control amount.

27. A sliding mode control method according to claim 26, wherein said control object is an oil pressure control system.

28. A sliding mode control method according to claim 26, wherein said control object is a valve timing control apparatus for continuously varying a rotation phase of a camshaft relative to a crankshaft by an oil pressure control and selectively controlling by a switching valve the supply and discharge of oil to an oil actuator to be oil pressure controlled.

29. A sliding mode control method according to claim 26, wherein said linear term of said control amount is set by adding a term proportional to the deviation between the target position and the actual position of said control object to a term proportional to an operation velocity of said control object.

30. A sliding mode control method according to claim 26, wherein said linear term of said control amount is set only by a term proportional to the deviation between the target position and the actual position of said control object.

31. A sliding mode control method comprising the steps of:
calculating a control amount by sliding mode control, said sliding mode control including a linear term for use in an operation dead band;
correcting said calculated control amount by a dither control; and
feedback controlling a control object having an operation dead band to a target value based on said corrected control amount.

32. A sliding mode control method according to claim 31, wherein a switching function of said sliding mode control is calculated as a function of a deviation between a target value and an actual value of said control object.

33. A sliding mode control method according to claim 32, wherein a condition that said correction amount by said dither control is added is set based on said switching function.

34. A sliding mode control method comprising the steps of:
calculating a control amount by sliding mode control;
correcting said calculated control amount by a dither control; and
feedback controlling a control object having an operation dead band to a target value based on said corrected control amount wherein a switching function of said sliding mode control is calculated as a function of a deviation between a target value and an actual value of said control object,
wherein said switching function is calculated in accordance with the following formula:

$$S=\gamma\times PERR+d(PERR)/dt$$

γ: inclination
PERR: deviation between a target value and an actual value of said control object
d(PERR)/dt: differential value of said deviation.

35. A sliding mode control method according to claim 34, wherein said switching function S is calculated in accordance with the following formula:

$$S=\gamma\times PERR+d(NOW)/dt$$

γ: inclination
PERR: deviation between a target value and an actual value of said control object
D(NOW)/dt: actual velocity of said control object.

36. A sliding mode control method according to claim 34, wherein said control amount U of said sliding mode control is calculated in accordance with the following formula:

$$U=c\times PERR+d\times\{d(NOW)/dt\}-K\{S/(|S|+\delta)\}$$

d(NOW)/dt: actual velocity of said control object
c, d: constant
δ: chattering prevention coefficient.

37. A sliding mode control method according to claim 34, wherein a condition that said correction amount of said dither control is added is set by the following formula $$S\cdot\Delta S\geq 0 \text{ or } |S|\geq S0$$

ΔS: change amount
S0: positive predetermined value.

38. A sliding mode control method comprising the steps of:
calculating a control amount by sliding mode control;
correcting said calculated control amount by a dither control; and
feedback controlling a control object having an operation dead band to a target value based on said corrected control amount, wherein said control object is a valve timing control apparatus for continuously varying a rotation phase of a camshaft relative to a crankshaft by an oil pressure control and selectively controlling by a switching valve the supply and discharge of an oil to an oil pressure actuator to be oil pressure controlled.

39. A sliding mode control method comprising the steps of:
setting a basic control amount corresponding to a central value of an operation dead band to a control amount of a control object;

calculating a feedback control amount by a sliding mode control to go beyond said operation dead band;

starting a feedback control to a target value of said control object by adding said feedback control amount;

stopping said feedback control when a deviation between a target value and an actual value of said control object gets within a predetermined control dead band; and correcting said basic control amount based on a steady deviation between the target value and the actual value of said control object when entering into said control dead band.

40. A sliding mode control method according to claim 39, wherein a switching function S of said sliding mode control is calculated as a function of a deviation between the target value and the actual value of said control object.

41. A sliding mode control method according to claim 40, wherein said switching function is calculated in accordance with the following formula:

$$S = \gamma \times PERR + d(PERR)/dt$$

$\gamma$: inclination

PERR: deviation between a target value and an actual value of said control object d(PERR)/dt: differential value of said deviation.

42. A sliding mode control method according to claim 40, wherein said switching function S is calculated in accordance with the following formula:

$$S = \gamma \times PERR + d(NOW)/dt$$

$\gamma$: inclination

PERR: deviation between a target value and an actual value of said control object d(NOW)/dt: actual velocity of said control object.

43. A sliding mode control method according to claim 41, wherein said feedback control amount U is calculated in accordance with the following formula:

$$U = c \times PERR + d \times \{d(NOW)/dt\} - K\{(S/|S|+\delta)\}$$

d(NOW)/dt: actual velocity of said control object c, d: constant $\delta$: chattering prevention coefficient.

44. A sliding mode control method according to claim 39, wherein said control object is a valve timing control apparatus for an internal combustion engine for continuously varying a rotation phase of a camshaft relative to a crankshaft by an oil pressure control and selectively controlling by a switching valve the supply and discharge of oil to an oil pressure actuator to be oil pressure controlled.

* * * * *